US011838648B2

(12) United States Patent
Okiyama

(10) Patent No.: US 11,838,648 B2
(45) Date of Patent: Dec. 5, 2023

(54) IMAGE PROCESSING DEVICE, IMAGING APPARATUS, IMAGE PROCESSING METHOD, AND PROGRAM FOR DETERMINING A CONDITION FOR HIGH DYNAMIC RANGE PROCESSING

(71) Applicant: FUJIFILM Corporation, Tokyo (JP)

(72) Inventor: Kazuya Okiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 129 days.

(21) Appl. No.: 16/894,174

(22) Filed: Jun. 5, 2020

(65) Prior Publication Data

US 2020/0304723 A1 Sep. 24, 2020

Related U.S. Application Data

(63) Continuation of application No. PCT/JP2018/042073, filed on Nov. 14, 2018.

(30) Foreign Application Priority Data

Dec. 7, 2017 (JP) ................................. 2017-235173

(51) Int. Cl.
*H04N 23/76* (2023.01)
*G06T 7/50* (2017.01)
(Continued)

(52) U.S. Cl.
CPC .............. *H04N 23/76* (2023.01); *G06T 7/50* (2017.01); *G06T 7/70* (2017.01); *H04N 23/71* (2023.01); *G06T 2207/30196* (2013.01)

(58) Field of Classification Search
CPC ...... H04N 5/243; H04N 5/2351; H04N 23/76; H04N 23/71; H04N 23/10; H04N 23/60;
(Continued)

(56) References Cited

U.S. PATENT DOCUMENTS 5,890,021 A * 3/1999 Onoda .................... G02B 7/346
396/121
6,088,539 A * 7/2000 Aoyama .................. G02B 7/34
396/123

(Continued)

FOREIGN PATENT DOCUMENTS

CN 101800859 A 8/2010
CN 101909150 A 12/2010
(Continued)

OTHER PUBLICATIONS

Chinese Office Action and Search Report, dated Jan. 21, 2021, for corresponding Chinese Application No. 201880078098.9, with English translations.
(Continued)

*Primary Examiner* — Usman A Khan
(74) *Attorney, Agent, or Firm* — Birch, Stewart, Kolasch & Birch, LLP

(57) ABSTRACT

There are provided an image processing device, an imaging apparatus, an image processing method, and a program that are capable of performing high dynamic range processing that reflects a shooting intention of a photographer. An image processing device (31) includes a metering mode information acquiring unit (101) that acquires metering mode information indicating a metering mode set from among a plurality of metering modes; a target area setting unit (103) that sets, on the basis of the metering mode information, a target area that is to be used to calculate a representative luminance that is to be used in high dynamic range processing; a first luminance calculating unit (105) that calculates the representative luminance on the basis of luminance information of the target area set by the target area setting unit; and a first condition determining unit (107) that determines a first condition of the high dynamic range
(Continued)

processing on the basis of the representative luminance calculated by the first luminance calculating unit.

8 Claims, 15 Drawing Sheets

(51) Int. Cl.
*G06T 7/70* (2017.01)
*H04N 23/71* (2023.01)

(58) Field of Classification Search
CPC ...... H04N 23/635; H04N 23/672; H04N 9/64; G06T 7/50; G06T 7/70; G06T 2207/30196; G06T 2207/20208; G06T 5/008; G03B 7/28; G03B 15/00
USPC ........................................................ 348/234
See application file for complete search history.

(56) References Cited

U.S. PATENT DOCUMENTS

| | | | | |
|---|---|---|---|---|
| 6,895,181 | B2* | 5/2005 | Nonaka ................. | G03B 13/36 396/125 |
| 7,245,325 | B2* | 7/2007 | Yamaguchi ............ | H04N 5/238 348/E5.04 |
| 9,167,172 | B2* | 10/2015 | Takaiwa ............. | H04N 5/36961 |
| 9,270,899 | B1* | 2/2016 | Ivanchenko ............ | G06T 7/194 |
| 9,538,081 | B1* | 1/2017 | Zhou ........................ | G06K 9/00 |
| 9,704,250 | B1* | 7/2017 | Shah ................ | H04N 5/232935 |
| 10,972,676 | B2* | 4/2021 | Chan ..................... | H04N 5/2351 |
| 2002/0145667 | A1* | 10/2002 | Horiuchi ................. | G06T 7/215 348/207.99 |
| 2002/0154907 | A1* | 10/2002 | Ojima .................... | G03B 15/02 396/61 |
| 2004/0101296 | A1 | 5/2004 | Nakata et al. | |
| 2006/0056684 | A1 | 3/2006 | Kurane | |
| 2006/0072028 | A1* | 4/2006 | Hong .................. | H04N 23/631 348/333.01 |
| 2008/0219516 | A1* | 9/2008 | Suzuki ................. | G06V 40/161 382/209 |
| 2009/0284613 | A1* | 11/2009 | Kim ................... | H04N 5/23232 348/222.1 |
| 2010/0201842 | A1 | 8/2010 | Jung et al. | |
| 2010/0309332 | A1 | 12/2010 | Ueda et al. | |
| 2011/0317030 | A1* | 12/2011 | Ohbuchi ............ | H04N 5/23219 348/E5.037 |
| 2012/0128341 | A1 | 5/2012 | Taniguchi | |
| 2013/0141634 | A1* | 6/2013 | Korenaga ............... | H04N 23/75 348/360 |
| 2013/0258175 | A1 | 10/2013 | Osawa | |
| 2014/0168486 | A1* | 6/2014 | Geiss .................... | H04N 5/2355 348/294 |
| 2014/0267822 | A1* | 9/2014 | Roffet ....................... | G06T 5/40 348/222.1 |
| 2016/0173759 | A1* | 6/2016 | Nakamura ....... | H04N 5/232127 348/222.1 |
| 2016/0191896 | A1* | 6/2016 | Basche .............. | H04N 5/23232 348/46 |
| 2017/0214837 | A1 | 7/2017 | Tamura | |
| 2019/0066271 | A1 | 2/2019 | Kanbara et al. | |

FOREIGN PATENT DOCUMENTS

| | | |
|---|---|---|
| CN | 102300049 A | 12/2011 |
| CN | 102540632 A | 7/2012 |
| CN | 107295269 A | 10/2017 |
| JP | 2002-305683 A | 10/2002 |
| JP | 2003-46848 A | 2/2003 |
| JP | 2005-159693 A | 6/2005 |
| JP | 2006-80942 A | 3/2006 |
| JP | 2008-52566 A | 3/2008 |
| JP | 2012-10048 A | 1/2012 |
| JP | 2013-214878 A | 10/2013 |
| WO | WO 2017/170723 A1 | 10/2017 |

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2018/042073, dated Jun. 18, 2020, with English translation.
International Search Report (Form PCT/ISA/210) for International Application No. PCT/JP2018/042073, dated Jan. 29, 2019, with English translation.
Chinese Office Action and Search Report for counterpart Chinese Application No. 201880078098.9, dated Sep. 28, 2021, with English translation.

* cited by examiner

IMAGE PROCESSING DEVICE, IMAGING APPARATUS, IMAGE PROCESSING METHOD, AND PROGRAM FOR DETERMINING A CONDITION FOR HIGH DYNAMIC RANGE PROCESSING

CROSS-REFERENCE TO RELATED APPLICATIONS

The present application is a Continuation of PCT International Application No. PCT/JP2018/042073 filed on Nov. 14, 2018 claiming priority under 35 U.S.C § 119(a) to Japanese Patent Application No. 2017-235173 filed on Dec. 7, 2017. Each of the above applications is hereby expressly incorporated by reference, in its entirety, into the present application.

BACKGROUND OF THE INVENTION

1. Field of the Invention

The present invention relates to an image processing device, an imaging apparatus, an image processing method, and a program, and specifically relates to an image processing device, an imaging apparatus, an image processing method, and a program that perform high dynamic range processing.

2. Description of the Related Art

When a captured image of a photographic subject with a wide dynamic range is acquired by a digital camera or the like, overexposure at a highlight portion or underexposure at a shadow portion may occur in some cases. High dynamic range processing (dynamic range expansion processing) is one method for expressing a wider dynamic range of a photographic subject in a captured image.

For example, JP2013-214878A describes a technique for acquiring a captured image in which the occurrence of overexposure or underexposure is suppressed even in backlit shooting. Specifically, JP2013-214878A describes a technique for acquiring an image in which overexposure or underexposure is suppressed, by acquiring a composite image by combining a high-exposure image, an intermediate-exposure image, and a low-exposure image.

SUMMARY OF THE INVENTION

In the case of performing high dynamic range processing, processing called tone mapping may be performed. Performing tone mapping on a captured image causes the image to have displayable contrast. Here, methods of tone mapping include, for example, a case of decreasing the contrast of an entire image to make a displayable image and a case of locally adjusting the contrast to make a displayable image.

In the case of locally adjusting the contrast, a representative luminance (reference luminance) is determined, and tone mapping is performed on the basis of the representative luminance. Here, use of an average luminance of an entire image as a representative luminance is known, for example.

However, an image may include a photographic subject that is not recognized as a main photographic subject by a user, and the luminance of a light area or dark area of a non-main photographic subject may be used to calculate a representative luminance at the time of combining images in high dynamic range processing. If tone mapping is performed on the basis of the representative luminance calculated in this way, the contrast of an entire high dynamic range processed image may be decreased, or it may be impossible to acquire a high dynamic range processed image intended by a photographer.

Furthermore, in a case where a light-dark difference between a shadow portion and a highlight portion is large, as in a backlit scene, the impression of an image to be acquired significantly varies depending on whether the shadow portion is given rich tone or the highlight portion is given rich tone. Thus, it is necessary to determine a tone curve in accordance with the luminance to which rich tone is to be allocated. Thus, when a tone curve is determined in accordance with a representative luminance reflecting a shooting intention of a photographer, an image that matches the shooting intention of the photographer can be acquired.

Here, the photographer may make camera settings to reflect his/her shooting intention at the time of shooting. In a case where the photographer reflects his/her shooting intention, for example, the photographer selects a metering mode for shooting, thereby reflecting his/her shooting intention in terms of brightness of a captured image. In another case where the photographer reflects his/her shooting intention, the photographer determines a main photographic subject with a shooting intention and brings the main photographic subject into focus. In this way, the photographer makes camera settings to acquire an image that matches his/her shooting intention.

As a result of reflecting the settings that reflect the shooting intention of the photographer in a representative luminance in tone mapping, an image reflecting the intention of the photographer can be acquired in an image that has undergone high dynamic range processing. JP2013-214878A mentioned above contains no mention of high dynamic range processing that reflects a shooting intention of a photographer.

The present invention has been made in view of these circumstances, and an object of the present invention is to provide an image processing device, an imaging apparatus, an image processing method, and a program that are capable of performing high dynamic range processing that reflects a shooting intention of a photographer.

To achieve the above object, an image processing device according to an aspect of the present invention includes a metering mode information acquiring unit that acquires metering mode information indicating a metering mode set from among a plurality of metering modes; a target area setting unit that sets, on the basis of the metering mode information, a target area that is to be used to calculate a representative luminance that is to be used in high dynamic range processing; a first luminance calculating unit that calculates the representative luminance on the basis of luminance information of the target area set by the target area setting unit; and a first condition determining unit that determines a first condition of the high dynamic range processing on the basis of the representative luminance calculated by the first luminance calculating unit.

According to this aspect, the representative luminance used in the high dynamic range processing is calculated on the basis of the luminance information of the target area that is set on the basis of the metering mode information indicating the set metering mode. In this aspect, the condition of the high dynamic range processing is determined on the basis of the representative luminance. Thus, this aspect is capable of realizing the determination of the condition of the high dynamic range processing that matches the shooting intention of a photographer.

Preferably, the first condition determining unit determines the first condition of the high dynamic range processing in which more tones are allocated to the representative luminance and luminances close to the representative luminance than to other luminances.

According to this aspect, the first condition determining unit determines the first condition of the high dynamic range processing in which more tones are allocated to the representative luminance and luminances close to the representative luminance than to other luminances. Accordingly, as a result of rich tone being expressed at and close to the representative luminance, this aspect is capable of realizing the determination of the condition of the high dynamic range processing reflecting the shooting intention of the photographer.

Preferably, the target area setting unit sets a metering area indicated by the metering mode information as the target area.

According to this aspect, the target area setting unit sets a metering area indicated by the metering mode information as the target area, and thus the representative luminance is calculated on the basis of the luminance information of an area similar to the metering area in the metering mode selected by the photographer.

Preferably, the target area setting unit sets a weight to luminance information of a peripheral area in accordance with a distance from the target area, the peripheral area being an area other than the target area, and the first luminance calculating unit calculates the representative luminance on the basis of the weighted luminance information of the peripheral area and the luminance information of the target area.

According to this aspect, the target area setting unit sets a weight to luminance information of a peripheral area in accordance with a distance from the target area, the peripheral area being an area other than the target area, and the first luminance calculating unit calculates the representative luminance on the basis of the weighted luminance information of the peripheral area and the luminance information of the target area. Accordingly, the representative luminance is calculated on the basis of the luminance information of the peripheral area around the target area as well as the luminance information of the target area, and thus this aspect is capable of realizing the determination of the condition of the high dynamic range processing reflecting the luminance of the entire captured image and the shooting intention of the photographer.

Preferably, the metering mode information acquiring unit acquires the metering mode information indicating a metering mode that uses, as a metering area, a person area in which a person has been detected, and the first luminance calculating unit calculates the representative luminance on the basis of luminance information of the person area.

According to this aspect, the metering mode information acquiring unit acquires the metering mode information indicating a metering mode that uses, as a metering area, a person area in which a person has been detected, and the first luminance calculating unit calculates the representative luminance on the basis of luminance information of the person area. Accordingly, in this aspect, high dynamic range processing is performed that matches the shooting intention of the photographer to shoot a person.

Preferably, the first luminance calculating unit calculates the representative luminance with an increased contribution ratio of the luminance information of the person area.

According to this aspect, the first luminance calculating unit calculates the representative luminance with an increased contribution ratio of the luminance information of the person area, and thus high dynamic range processing based on the luminance information of the shooting area of the person as the shooting intention of the photographer is realized.

Preferably, the first condition determining unit sets a condition of tone mapping on the basis of the representative luminance in the high dynamic range processing that is performed by combining a plurality of captured images.

According to this aspect, the first condition determining unit sets a condition of tone mapping on the basis of the representative luminance in the high dynamic range processing that is performed by combining a plurality of captured images, and thus the shooting intention of the photographer can be reflected also in the high dynamic range processing with image combining, which is one style of high dynamic range processing.

Preferably, the first condition determining unit sets a condition of a tone curve selected on the basis of the representative luminance in the high dynamic range processing that is performed by changing a tone curve of a single captured image.

According to this aspect, the first condition determining unit sets a condition of a tone curve selected on the basis of the representative luminance in the high dynamic range processing that is performed by changing a tone curve of a single captured image, and thus the shooting intention of the photographer can be reflected also in the high dynamic range processing of changing a tone curve of a single captured image, which is one style of high dynamic range processing.

Preferably, the image processing device includes a tone mapping unit that performs contrast correction on the basis of the first condition of the high dynamic range processing determined by the first condition determining unit. The tone mapping unit performs the contrast correction in accordance with a distance from the target area.

According to this aspect, the tone mapping unit performs contrast correction on the basis of the first condition of the high dynamic range processing determined by the first condition determining unit. In addition, the tone mapping unit performs the contrast correction in accordance with the distance from the target area. Accordingly, this aspect is capable of realizing tone mapping that reflects the shooting intention of the photographer.

Preferably, the image processing device includes a shooting mode information acquiring unit that acquires shooting mode information which is information about a shooting mode for shooting a photographic subject; and an upper-limit/lower-limit determining unit that determines, on the basis of the shooting mode information acquired by the shooting mode information acquiring unit, an upper limit or a lower limit of the luminance information of the target area that is to be used to calculate the representative luminance. The first luminance calculating unit calculates the representative luminance on the basis of the luminance information for which the upper limit or the lower limit is set.

According to this aspect, the shooting mode information acquiring unit acquires shooting mode information which is information about a shooting mode for shooting a photographic subject, and an upper limit or a lower limit of the luminance information of the target area that is to be used to calculate the representative luminance is determined on the basis of the acquired shooting mode information. Accordingly, this aspect is capable of increasing the expansion range of a dynamic range in a specific shooting scene (for example, twilight scene shooting, night scene shooting, and fireworks shooting).

Preferably, the image processing device includes an in-focus information acquiring unit that acquires information about an in-focus position of a captured image; a distance measurement information acquiring unit that acquires first distance information which is distance information of a plurality of areas in the captured image; a distance information calculating unit that calculates, on the basis of the information about the in-focus position and the first distance information of the plurality of areas, for each of the plurality of areas, second distance information which is information indicating a distance from the in-focus position; an area determining unit that determines, on the basis of the second distance information, for each of the plurality of areas, a representative luminance calculation area for acquiring the luminance information that is to be used to calculate the representative luminance that is to be used in the high dynamic range processing; a second luminance calculating unit that calculates the representative luminance on the basis of luminance information of the representative luminance calculation area; a second condition determining unit that determines a second condition of the high dynamic range processing on the basis of the representative luminance calculated by the second luminance calculating unit; and a condition selecting unit that determines, on the basis of the metering mode information, which of the first condition and the second condition is to be used to perform the high dynamic range processing.

According to this aspect, the representative luminance used in the high dynamic range processing is calculated on the basis of the luminance information of the target area set on the basis of the metering mode information indicating the set metering mode or is calculated on the basis of the luminance information of the representative luminance calculation area determined by using distance information from the in-focus position. Which of the first condition determined on the basis of the representative luminance calculated by using the metering mode information and the second condition determined on the basis of the representative luminance calculated by using the distance information from the in-focus position is to be used to perform the high dynamic range processing is determined by using the metering mode information. Accordingly, in this aspect, high dynamic range processing is performed on the basis of the representative luminance calculated by using the metering mode information in the case of the metering mode in which the shooting intention of the photographer is adequately reflected, whereas high dynamic range processing is performed on the basis of the representative luminance reflecting the shooting intention of the photographer in accordance with the in-focus position in the case of the metering mode in which the shooting intention of the photographer is not adequately reflected.

An image processing device according to another aspect of the present invention includes an in-focus information acquiring unit that acquires information about an in-focus position of a captured image; a distance measurement information acquiring unit that acquires first distance information which is distance information of a plurality of areas in the captured image; a distance information calculating unit that calculates, on the basis of the information about the in-focus position and the first distance information of the plurality of areas, for each of the plurality of areas, second distance information which is information indicating a distance from the in-focus position; an area determining unit that determines, on the basis of the second distance information, for each of the plurality of areas, a representative luminance calculation area for acquiring luminance information that is to be used to calculate a representative luminance that is to be used in high dynamic range processing; a second luminance calculating unit that calculates the representative luminance on the basis of luminance information of the representative luminance calculation area; and a second condition determining unit that determines a second condition of the high dynamic range processing on the basis of the representative luminance calculated by the second luminance calculating unit.

According to this aspect, the representative luminance used in the high dynamic range processing is calculated on the basis of the luminance information of the representative luminance calculation area that is determined by using the distance information from the in-focus position. In this aspect, the condition of the high dynamic range processing is determined on the basis of the representative luminance. A photographer determines a main photographic subject with a shooting intention and brings the main photographic subject into focus. Thus, this aspect is capable of realizing the high dynamic range processing that matches the shooting intention of the photographer.

Preferably, the second condition determining unit determines the second condition of the high dynamic range processing in which more tones are allocated to the representative luminance and luminances close to the representative luminance than to other luminances.

Preferably, the area determining unit determines the representative luminance calculation area on the basis of the second distance information and a depth of field.

According to this aspect, the area determining unit determines the representative luminance calculation area in accordance with the depth of field reflecting the shooting intention of the photographer, and thus the high dynamic range processing reflecting the shooting intention of the photographer can be realized.

Preferably, the image processing device includes a shooting mode information acquiring unit that acquires shooting mode information which is information about a shooting mode for shooting a photographic subject; and an upper-limit/lower-limit determining unit that determines, on the basis of the shooting mode information acquired by the shooting mode information acquiring unit, an upper limit or a lower limit of the luminance information of the representative luminance calculation area that is to be used to calculate the representative luminance. The second luminance calculating unit calculates the representative luminance on the basis of the luminance information for which the upper limit or the lower limit is set.

According to this aspect, the shooting mode information acquiring unit acquires shooting mode information which is information about a shooting mode for shooting a photographic subject, and an upper limit or a lower limit of the luminance information of the representative luminance calculation area that is to be used to calculate the representative luminance is determined on the basis of the acquired shooting mode information. Accordingly, this aspect is capable of increasing the expansion range of a dynamic range in a specific shooting scene (for example, twilight scene shooting, night scene shooting, and fireworks shooting).

An imaging apparatus according to another aspect of the present invention includes the above-described image processing device.

An image processing method according to another aspect of the present invention includes a metering mode information acquisition step of acquiring metering mode information indicating a metering mode set from among a plurality of metering modes; a target area setting step of setting, on the basis of the metering mode information, a target area that is to be used to calculate a representative luminance that is to be used in high dynamic range processing; a first luminance calculation step of calculating the representative luminance on the basis of luminance information of the target area set in the target area setting step; and a first condition determination step of determining a first condition of the high dynamic range processing on the basis of the representative luminance calculated in the first luminance calculation step.

An image processing method according to another aspect of the present invention includes an in-focus information acquisition step of acquiring information about an in-focus position of a captured image; a distance measurement information acquisition step of acquiring first distance information which is distance information of a plurality of areas in the captured image; a distance information calculation step of calculating, on the basis of the information about the in-focus position and the first distance information of the plurality of areas, for each of the plurality of areas, second distance information which is information indicating a distance from the in-focus position; an area determination step of determining, on the basis of the second distance information, for each of the plurality of areas, a representative luminance calculation area for acquiring luminance information that is to be used to calculate a representative luminance that is to be used in high dynamic range processing; a second luminance calculation step of calculating the representative luminance on the basis of luminance information of the representative luminance calculation area; and a second condition determination step of determining a second condition of the high dynamic range processing on the basis of the representative luminance calculated in the second luminance calculation step.

A program according to another aspect of the present invention causes a computer to execute image processing steps including a metering mode information acquisition step of acquiring metering mode information indicating a metering mode set from among a plurality of metering modes; a target area setting step of setting, on the basis of the metering mode information, a target area for acquiring luminance information that is to be used to calculate a representative luminance that is to be used in high dynamic range processing; a first luminance calculation step of calculating the representative luminance on the basis of luminance information of the target area set in the target area setting step; and a first condition determination step of determining a first condition of the high dynamic range processing on the basis of the representative luminance calculated in the first luminance calculation step.

A program according to another aspect of the present invention causes a computer to execute image processing steps including an in-focus information acquisition step of acquiring information about an in-focus position of a captured image; a distance measurement information acquisition step of acquiring first distance information which is distance information of a plurality of areas in the captured image; a distance information calculation step of calculating, on the basis of the information about the in-focus position and the first distance information of the plurality of areas, for each of the plurality of areas, second distance information which is information indicating a distance from the in-focus position; an area determination step of determining, on the basis of the second distance information, for each of the plurality of areas, a representative luminance calculation area for acquiring luminance information that is to be used to calculate a representative luminance that is to be used in high dynamic range processing; a second luminance calculation step of calculating the representative luminance on the basis of luminance information of the representative luminance calculation area; and a second condition determination step of determining a second condition of the high dynamic range processing on the basis of the representative luminance calculated in the second luminance calculation step.

According to the present invention, a representative luminance reflecting a shooting intention of a photographer is calculated, and a condition of high dynamic range processing is determined on the basis of the representative luminance. Thus, high dynamic range processing that matches the shooting intention of the photographer can be performed.

DESCRIPTION OF THE PREFERRED EMBODIMENTS

Preferred embodiments of an image processing device, an imaging apparatus, an image processing method, and a program according to the present invention will be described with reference to the attached drawings.

In the following description, an image processing device equipped in an imaging apparatus will be mainly described, but the application range of the present invention is not limited thereto. For example, the image processing device according to the present invention can be equipped in a computer.

Figure 1:
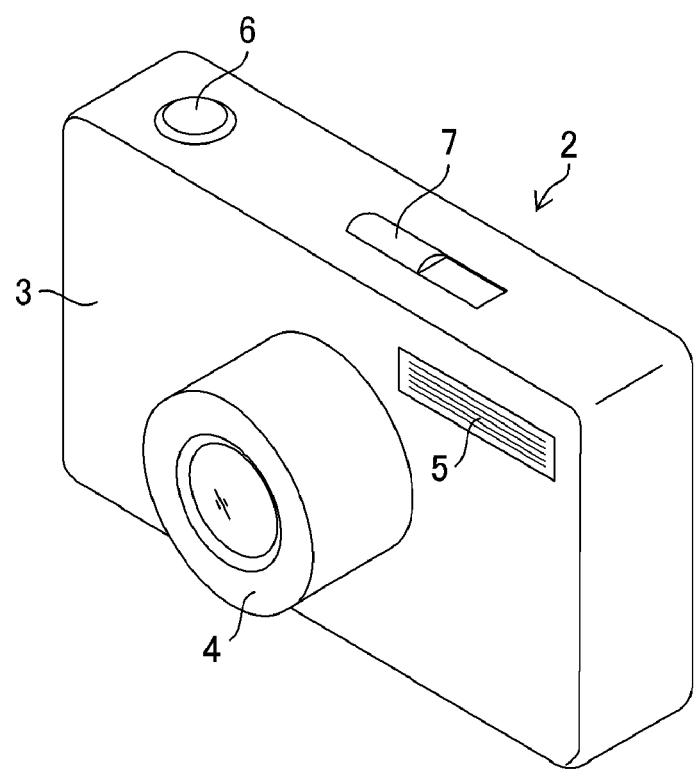
FIG. 1 is a perspective front view of a digital camera.
Figure 2:
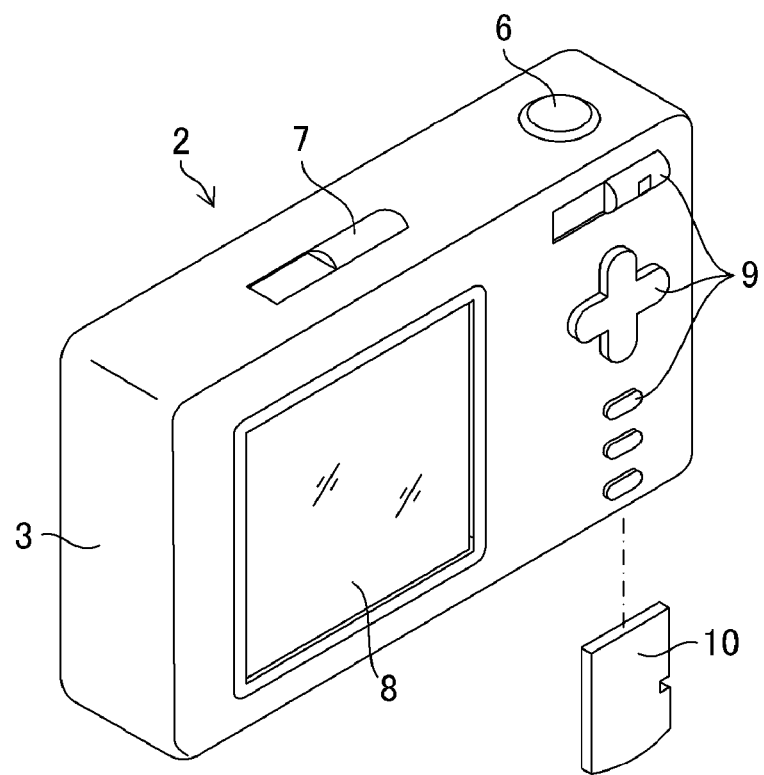
FIG. 2 is a perspective back view of the digital camera.

FIG. 1 is a perspective front view of a digital camera 2, which is the imaging apparatus equipped with the image processing device according to the present invention. FIG. 2 is a perspective back view of the digital camera 2.

The digital camera 2 includes a camera main body 3 and a lens barrel 4 attached to a front surface of the camera main body 3. The lens barrel 4 may be provided integrally to the camera main body 3 or may be provided so as to be attachable to/detachable from the camera main body 3 to form an interchangeable lens camera.

The front surface of the camera main body 3 is provided with a flash emitting unit 5 in addition to the lens barrel 4, and an upper surface of the camera main body 3 is provided with a shutter button 6 and a power switch 7. The shutter button 6 is an image capturing instruction unit that receives an image capturing instruction from a user, and is constituted by a two-stroke switch having an S1 switch that is turned on by a half push and an S2 switch that is turned on by a full push. The power switch 7 is a power switch unit that receives an instruction to switch between ON and OFF of the power of the digital camera 2 from a user.

A rear surface of the camera main body 3 is provided with a display unit 8 constituted by a liquid crystal panel or the like and an operation unit 9 operated directly by a user. The display unit 8 functions as an electronic view finder displaying a live view image (through image) in an image capturing standby state, and functions as a played back image display unit during playback of a captured image or an image stored in a memory.

The operation unit 9 is constituted by certain operation devices, such as a mode changing switch, a cross key, and an execution key. For example, the mode changing switch is operated by a user to change an operation mode of the digital camera 2. The operation modes of the digital camera 2 include shooting modes for capturing an image of a photographic subject to acquire a captured image (an auto shooting mode, a manual shooting mode, a continuous shooting mode, and the like), and a playback mode for playing back and displaying an image.

The auto shooting mode is a mode in which an auto focus (AF) function for automatically adjusting focus, an auto exposure (AE) function for automatically setting an aperture value and a shutter speed, and the like are used. The manual shooting mode is a mode in which a user is allowed to appropriately set a focus adjustment, an aperture value, a shutter speed, and the like by using the operation unit 9.

On the other hand, the cross key and the execution key are operated by a user to display a menu screen or a setting screen on the display unit 8, to move a cursor displayed within the menu screen or the setting screen, or to confirm the various settings of the digital camera 2.

A bottom portion of the camera main body 3 (not illustrated) is provided with a memory slot in which an external memory 10 is to be loaded and a lid with which the opening of the memory slot is opened or closed. The external memory 10 is provided in the camera main body 3 in an attachable/detachable manner. When loaded in the camera main body 3, the external memory 10 is electrically connected to a storage control unit 33 provided in the camera main body 3. The external memory 10 may be typically constituted by a semiconductor memory, such as a card-type flash memory, but is not particularly limited, and a storage medium of any storage scheme, such as a magnetic medium, may be used as the external memory 10.

Figure 3:
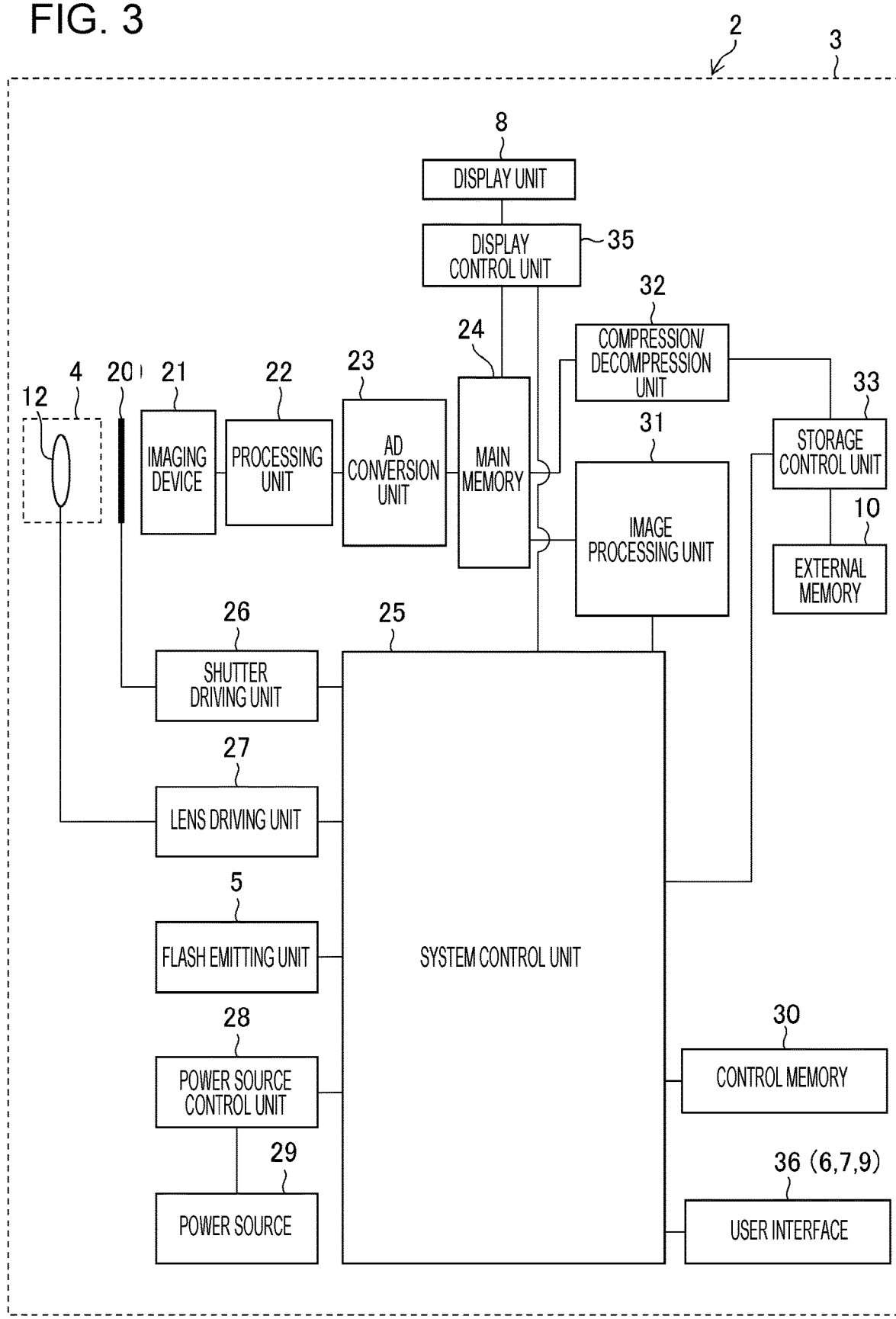
FIG. 3 is a block diagram illustrating a control processing system of the digital camera.

FIG. 3 is a block diagram illustrating a control processing system of the digital camera 2.

Subject light passes through a lens unit 12 provided in the lens barrel 4 and a mechanical shutter 20 provided in the camera main body 3 and is received by an imaging device 21. The lens unit 12 is constituted by an image capturing optical system including an image capturing lens and a diaphragm. The imaging device 21 is a device that optically receives a subject image and generates an imaging signal (image data), and has color filters of RGB (red, green, and blue) and an image sensor for converting an optical image to an electric signal, such as a charge coupled device (CCD) or a complementary metal oxide semiconductor (CMOS) sensor. The image data output from the imaging device 21 is processed by an automatic gain control (AGC) circuit or the like in a processing unit 22, and then the image data in an analog format is converted to image data in a digital format by an analog-to-digital (AD) conversion unit 23. The digitalized image data is stored in a main memory 24.

The main memory 24 is a region that temporarily stores image data and is constituted by a dynamic random access memory (DRAM) or the like. The image data transmitted from the AD conversion unit 23 and stored in the main memory 24 is read out by an image processing unit 31 that is controlled by a system control unit 25. The image processing unit 31 uses the image data generated by the imaging device 21 as input image data, performs various image processing operations, such as white balance correction, gamma-correction processing, and demosaicing processing, and stores the image data that has undergone the image processing in the main memory 24 again.

The image data that has undergone the image processing by the image processing unit 31 and that has been stored in the main memory 24 is read out by a display control unit 35 and a compression/decompression unit 32. The display control unit 35 controls the display unit 8 and causes the display unit 8 to display the image data read out from the main memory 24. In this way, the image data that has been output from the imaging device 21 and undergone the image processing by the image processing unit 31 is displayed on the display unit 8 as an image capturing confirmation image (post-view image)

On the other hand, the compression/decompression unit 32 performs compression processing on the image data read out from the main memory 24 to generate image data of a certain compression format, such as Joint Photographic Experts Group (JPEG) or Tagged Image File Format (TIFF). The image data that has undergone the compression processing is stored in the external memory 10 by the storage control unit 33 that controls processing of storing data in the eternal memory 10 and processing of reading out data from the external memory 10. Image capturing information in a certain format is added to the image data. For example, the Exchangeable image file format (Exif) may be adopted.

In the playback mode in which the image data stored in the external memory 10 is played back, the image data stored in the external memory 10 is read out by the storage control unit 33 that is controlled by the system control unit 25, decompressed by the compression/decompression unit 32, and then stored in the main memory 24. In a procedure similar to a procedure of confirmation display of a captured image, the image data is read out from the main memory 24 by the display control unit 35 and played back to be displayed in the display unit 8.

In response to a first-stage push (half push) of the shutter button 6, an AF processing function of the digital camera 2 adds up the absolute values of high-frequency components of image data corresponding to an AF area taken at the time of the half push, and outputs the cumulative value (AF evaluation value) to the system control unit 25.

In response to a first-stage push (half push) of the shutter button 6, an AE detection function adds up digital signals corresponding to an entire screen or adds up image data in which different weights are applied in a screen center portion and a screen peripheral portion, and outputs the cumulative value to the system control unit 25.

The system control unit 25 controls the main memory 24, the image processing unit 31, and the storage control unit 33, as described above, and also controls other parts of the digital camera 2 (the AF processing function and the AE detection function).

In response to a half push of the shutter button 6 during the auto shooting mode, the system control unit 25 operates the AE detection function, calculates a subject luminance (image capturing Ev value) from a cumulative value received from the AE detection function, and determines an aperture value of the diaphragm and a shutter speed (the mechanical shutter 20 and/or charge accumulation time of the imaging device 21) on the basis of the image capturing Ev value in accordance with a program chart. In response to a full push of the shutter button 6, the system control unit 25 controls the diaphragm on the basis of the determined aperture value, controls the mechanical shutter 20 via a shutter driving unit 26 on the basis of the determined shutter speed, and controls the charge accumulation time in the imaging device 21 via an imaging device driving unit that is not illustrated.

The digital camera 2 is equipped in advance with a plurality of metering modes for measuring a subject luminance. For example, in the digital camera 2, metering modes of "multi", "spot", "average", and "center-weighted" are set in advance. In the "multi" metering mode, for example, the imaging apparatus determines information, such as the luminance distribution, colors, background, and composition of a photographic subject, and selects a metering method. In the "spot" metering mode, for example, metering is performed so as to optimize the exposure at a center portion of a screen. The "spot" metering mode is used, for example, when the brightness is greatly different between a photographic subject and a background, such as in a backlit scene. The "average" metering mode is, for example, a metering mode of performing metering by averaging an entire screen (an entire image capturing range). In the "average" metering mode, the exposure is less likely to be changed according to a composition or a photographic subject, and this mode is used to shoot, for example, a person wearing white or black clothes or a landscape. In the "center-weighted" metering mode, for example, an exposure value is determined by measuring light preferentially at a center portion of a shooting screen.

From among the plurality of metering modes set in advance, a photographer selects and sets a metering mode so that the photographer is capable of acquiring a captured image that expresses his/her shooting intention. For example, the photographer selects and sets a metering mode via the operation unit 9.

In response to a half push of the shutter button 6 during the auto shooting mode, the system control unit 25 moves a focus lens of the lens unit 12 from the closest side to the infinity side via a lens driving unit 27, and operates the AF processing function to acquire AF evaluation values at individual lens positions from the AF processing function. Subsequently, the system control unit 25 searches for an in-focus position at which the AF evaluation value is the largest, and moves the focus lens to the in-focus position, thereby adjusting focus on a photographic subject (main photographic subject). On the basis of the position to which the focus lens has been moved, the system control unit 25 acquires information about the in-focus position.

In addition, the system control unit 25 has a function of measuring a distance to a photographic subject within a shooting angle of view. For example, the system control unit 25 disposes phase-difference pixels in the entire area of the imaging device 21, thereby acquiring distances to individual photographic subjects that are present within the shooting angle of view. In addition, for example, the system control unit 25 is capable of acquiring distances to individual photographic subjects that are acquired by a rangefinder (not illustrated) constituted by a laser or the like equipped in the digital camera 2.

In addition, the system control unit 25 controls a power source control unit 28 to detect, in a power source 29, whether or not a battery has been loaded, the type of battery, a remaining battery life, and the like. In addition, the system control unit 25 controls various processing units constituting the image processing unit 31.

In addition, the system control unit 25 acquires operation signals from a user interface 36 including the shutter button 6, the power switch 7, and the operation unit 9, and performs various processing operations and device control in accordance with the operation signals. In addition, the system control unit 25 controls the power source control unit 28 in accordance with a power ON/OFF signal received from the power switch 7 and controls ON and OFF of the power source 29.

Programs, data, and the like that are necessary for various processing operations and device control performed by the system control unit 25 are stored in the main memory 24. The system control unit 25 is capable of reading out a program, data, or the like stored in a control memory 30 and is also capable of storing a new program, data, or the like in the control memory 30 as appropriate.

First Embodiment

Figure 4:
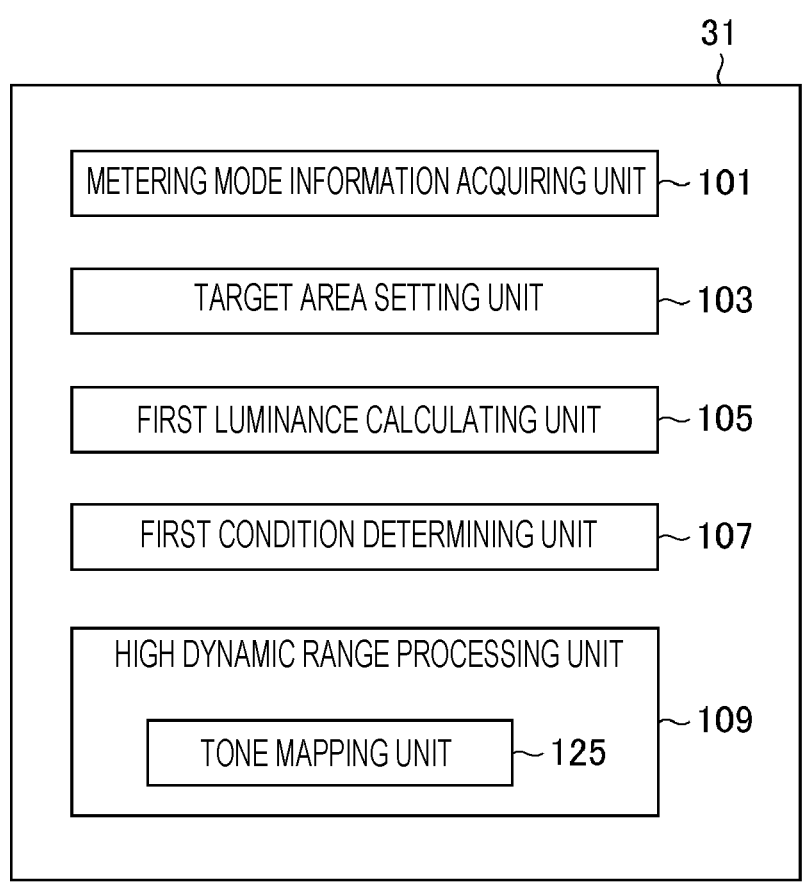
FIG. 4 is a block diagram illustrating an example functional configuration of an image processing unit.

Next, the image processing unit (image processing device) 31 according to a first embodiment of the present invention will be described. FIG. 4 is a block diagram illustrating an example functional configuration of the image processing unit 31 according to the present embodiment. The image processing unit 31 according to the present embodiment is constituted by a metering mode information acquiring unit 101, a target area setting unit 103, a first luminance calculating unit 105, a first condition determining unit 107, and a high dynamic range processing unit 109.

The metering mode information acquiring unit 101 acquires metering mode information indicating a metering mode set from among a plurality of metering modes. That is, the metering mode information acquiring unit 101 acquires information about a metering mode selected and set by a photographer at the time of shooting. For example, the digital camera 2 is equipped in advance with multi, spot, average, and center-weighted metering modes. The photographer selects, at the time of AE, a metering mode from among the preset metering modes so that the photographer is capable of making an expression in accordance with his/her shooting intention. The information acquired by the metering mode information acquiring unit 101 includes information about a metering area in the metering mode or a method for calculating a photometric value. As will be described below, it is sufficient that the information acquired by the metering mode information acquiring unit 101 include information that is necessary to determine a target area that is to be used to calculate a representative luminance. For example, the information acquired by the metering mode information acquiring unit 101 is information about a metering area in the set metering mode.

The target area setting unit 103 sets, on the basis of the metering mode information, a target area that is to be used to calculate a representative luminance that is to be used in high dynamic range processing. That is, the target area setting unit 103 sets, on the basis of the metering mode information selected by the photographer, an area for calculating the representative luminance that is to be used in the high dynamic range processing, thereby being capable of reflecting the shooting intention of the photographer in the high dynamic range processing. For example, the target area setting unit 103 sets a metering area indicated by the metering mode information as a target area.

Figure 5:
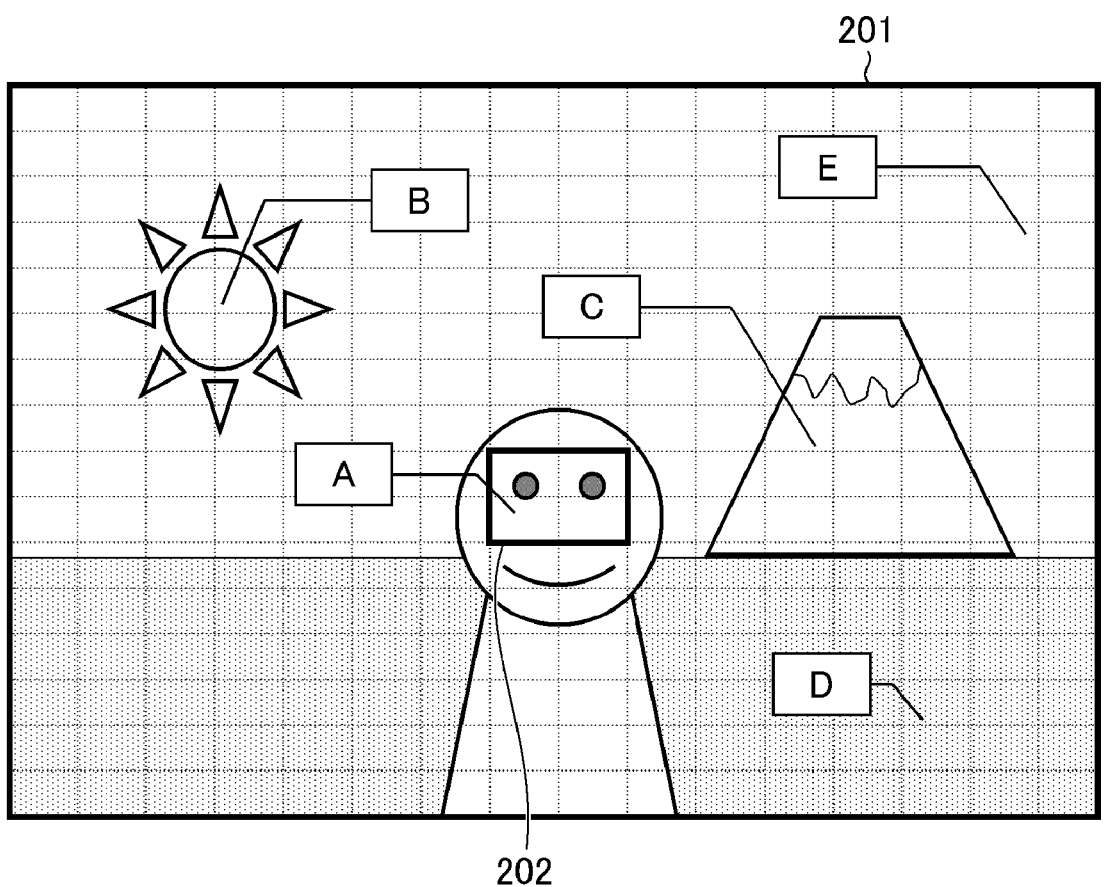
FIG. 5 is a diagram illustrating a captured image.

FIG. 5 is a diagram illustrating a captured image acquired by the digital camera 2.

In a captured image 201, a person A, a sun B, a mountain C, a ground D, and others (sky and so forth) E are present as objects. It is assumed that, in the captured image 201, the sun B is a maximum-luminance object and the ground D is a minimum-luminance object.

In conventional high dynamic range processing for the scene of the captured image 201, high dynamic range processing is performed by using the luminances of the person A, the sun B, the mountain C, the ground D, and the others (sky and so forth) E. Thus, the contrast of the entire image decreases, and the image may be against the intention of the photographer.

When a metering area 202 is selected in the spot metering mode, the luminance information of the area of the sun B and the area of the ground D is not referred to (or referred to with a decreased contribution ratio). In this way, as a result of setting the metering area 202 as a target area, an object in the metering area 202 is shot with appropriate exposure in the selected metering mode, and it is possible to generate an image that has undergone high dynamic range processing with tone mapping processing that prevents the contrast within the metering area 202 from decreasing.

The first luminance calculating unit 105 calculates the representative luminance on the basis of luminance information of the target area set by the target area setting unit 103. For example, the first luminance calculating unit 105 calculates an average luminance within the target area, and acquires a representative luminance by using the average luminance as luminance information. Alternatively, the first luminance calculating unit 105 may calculate the luminance within the target area as luminance information by using another calculation method. Here, the representative luminance is a luminance that is used as a reference in the case of performing tone mapping. For example, in the case of performing tone mapping, in a predetermined luminance range including a representative luminance, more tones are allocated to the representative luminance and luminances close to the representative luminance than to the other luminances. That is, in tone mapping, adjustment is performed such that a tone curve is the steepest at and close to the representative luminance.

The first condition determining unit 107 determines a first condition of the high dynamic range processing on the basis of the representative luminance calculated by the first luminance calculating unit 105. For example, the first condition determining unit 107 determines the first condition of the high dynamic range processing in which more tones are allocated to the representative luminance and luminances close to the representative luminance than to the other luminances. That is, the first condition determining unit 107 performs tone mapping such that a tone curve is the steepest in 3 to 10% of the entire luminance range including a representative luminance Ya, preferably, 5 to 7% of the entire luminance range. The first condition of the high dynamic range processing determined by the first condition determining unit 107 is determined on the basis of the representative luminance and is, for example, a tone curve used in tone mapping.

The first condition determining unit 107 sets a condition of tone mapping on the basis of the representative luminance in the high dynamic range processing that is performed by combining a plurality of captured images. In addition, the first condition determining unit 107 sets a condition of a tone curve selected on the basis of the representative luminance in the high dynamic range processing that is performed by changing a tone curve of a single captured image. That is, the first condition determining unit 107 sets a high dynamic range processing condition about high dynamic range processing that is performed by combining a plurality of captured images and high dynamic range processing that is performed by correcting the contrast of a single captured image.

Figure 6:
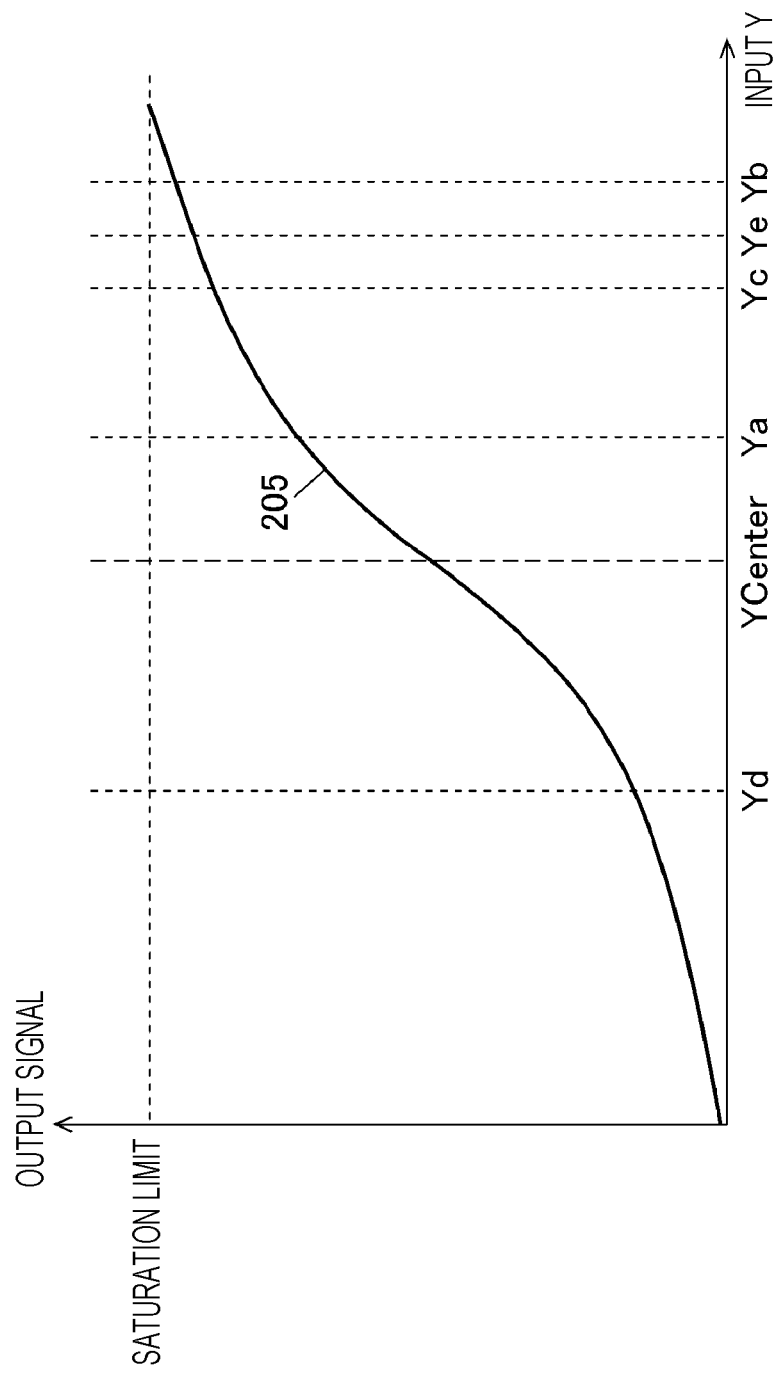
FIG. 6 is a diagram illustrating a tone curve corresponding to a representative luminance.
Figure 7:
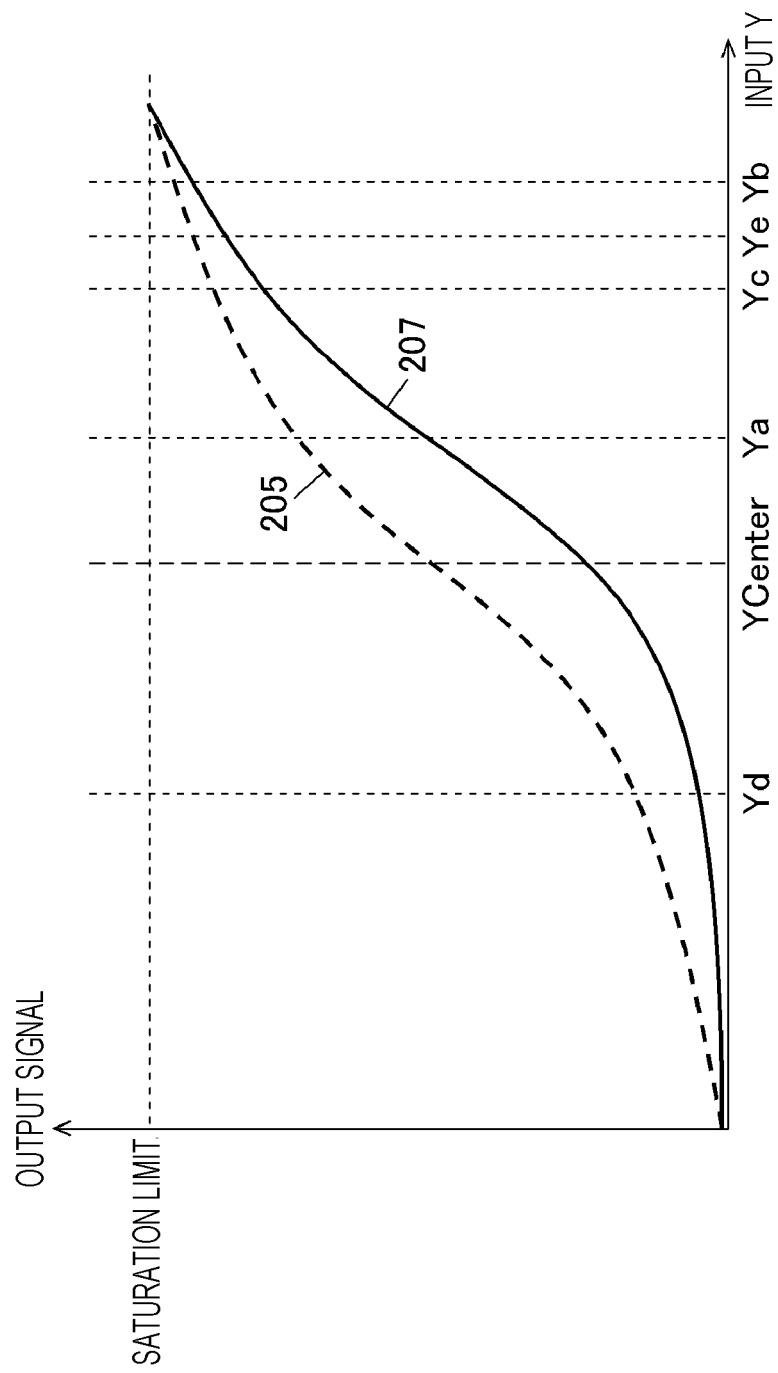
FIG. 7 is a diagram illustrating a tone curve corresponding to a representative luminance.

FIG. 6 and FIG. 7 are diagrams each illustrating a tone curve corresponding to a representative luminance.

FIG. 6 illustrates a case where a representative luminance is calculated by using a conventional method and tone mapping is performed by using the determined representative luminance. That is, an average luminance of an entire captured image is calculated, and a tone curve 205 is created by using the average luminance YCenter as a representative luminance. The image whose contrast is corrected by using the tone curve 205 uses the average luminance YCenter of the entire captured image as a representative luminance, and thus the shooting intention of the photographer is not necessarily reflected on the tone curve. In the figure, Ya, Yb, Yc, Yd, and Ye represent the average luminances of the person A, the sun B, the mountain C, the ground D, and the others (sky and so forth) E, respectively.

FIG. 7 illustrates a case where a first condition is determined on the basis of the representative luminance Ya calculated by the first luminance calculating unit 105. For example, the representative luminance Ya is the average luminance of a target area (metering area 202) set by the target area setting unit 103.

A tone curve 207 corresponding to the representative luminance Ya is, different from the tone curve 205 corresponding to the representative luminance YCenter, a tone curve reflecting the intention of the photographer. That is, the representative luminance Ya is the average luminance of the target area that is set on the basis of the metering mode selected by the photographer according to the shooting intention. Thus, the captured image that has undergone high dynamic range processing in which tone mapping is performed by using the tone curve 207 reflects the shooting intention of the photographer.

The high dynamic range processing unit 109 performs high dynamic range processing on a captured image.

The high dynamic range processing unit 109 may perform high dynamic range processing by combining a plurality of captured images or may perform high dynamic range processing by applying a tone curve of a single captured image. Here, in the case of performing high dynamic range processing by combining a plurality of captured images, the high dynamic range processing is performed by generating one composite image from a plurality of captured images having different exposure conditions. In the case of performing dynamic range expansion processing by correcting an output value of a signal of one captured image, correction is performed by applying to a signal a tone curve that suppresses underexposure at a dark portion and overexposure at a light portion. In this case, a corrected image with rich tone can be generated by capturing an image with a smaller amount of exposure than that of an ordinary image and correcting an output value of the signal of the captured image.

The high dynamic range processing unit 109 has a tone mapping unit 125. The tone mapping unit 125 performs contrast correction on the basis of the first condition of the high dynamic range processing determined by the first condition determining unit 107. The tone mapping unit 125 performs tone mapping after the dynamic range has been expanded or at the same time when the dynamic range is expanded. For example, the tone mapping unit 125 performs contrast correction in accordance with the distance from a target area.

Next, a description will be given of an example of a tone curve determined on the basis of a representative luminance according to the present invention.

Figure 8:
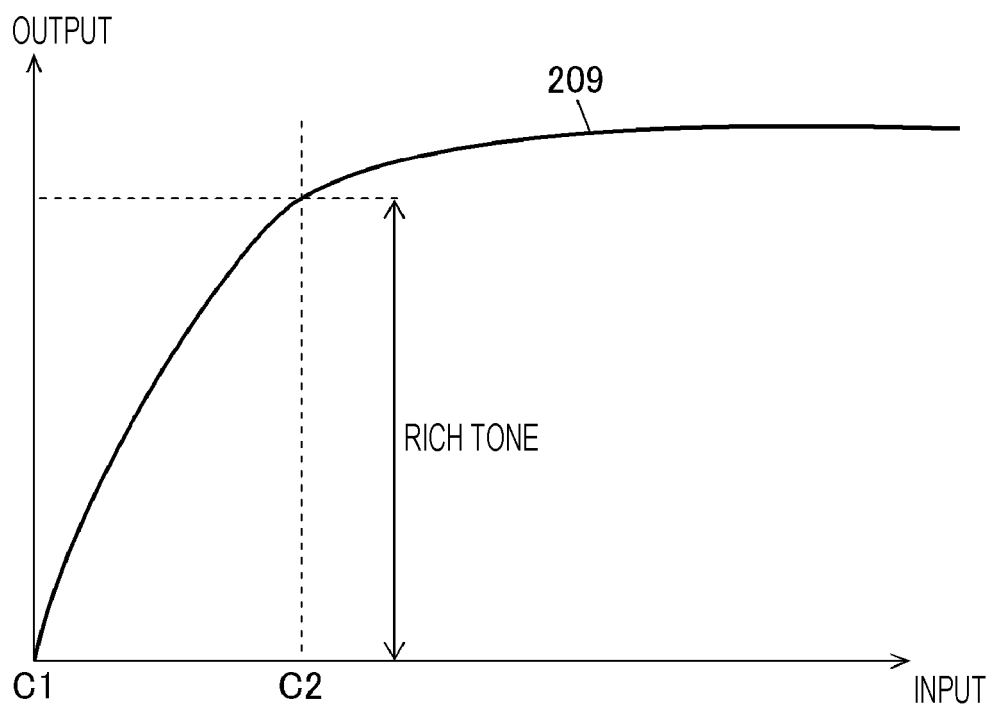
FIG. 8 is a diagram illustrating an example of a tone curve determined on the basis of a representative luminance according to the present invention.
Figure 9:
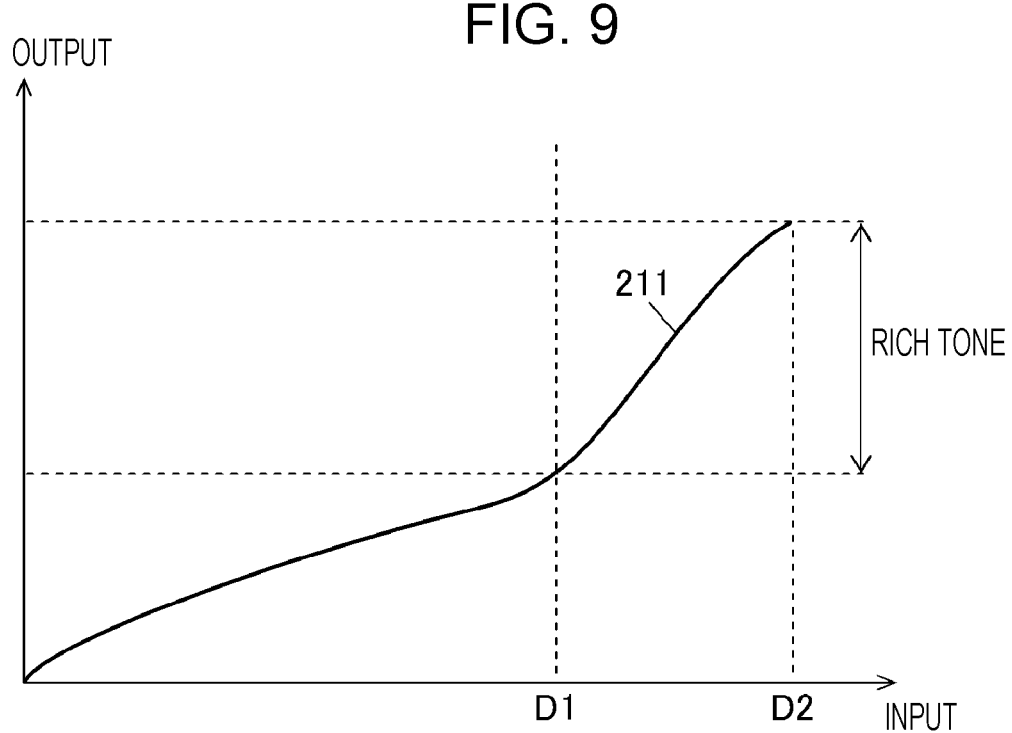
FIG. 9 is a diagram illustrating an example of a tone curve determined on the basis of a representative luminance according to the present invention.

FIG. 8 and FIG. 9 are diagrams each illustrating an example of a tone curve determined on the basis of a representative luminance according to the present invention. FIG. 8 illustrates a tone curve 209 in which more tones are allocated on a shadow side. That is, the shooting intention of the photographer is that a picture on the shadow side is to be expressed in more detail, and the tone curve 209 is designed such that rich tone is given in input values (input luminances) C1 to C2 on the shadow side. That is, the tone curve 209 is designed such that the tone curve 209 is the steepest in the input values C1 to C2.

FIG. 9 illustrates a tone curve 211 in which more tones are allocated on a highlight side. That is, the shooting intention of the photographer is that a picture on the highlight side is to be expressed in more detail, and the tone curve 211 is designed such that rich tone is given in input values (input luminances) D1 to D2 on the highlight side. That is, the tone curve 211 is designed such that the tone curve 211 is the steepest in the input values D1 to D2.

Figure 10:
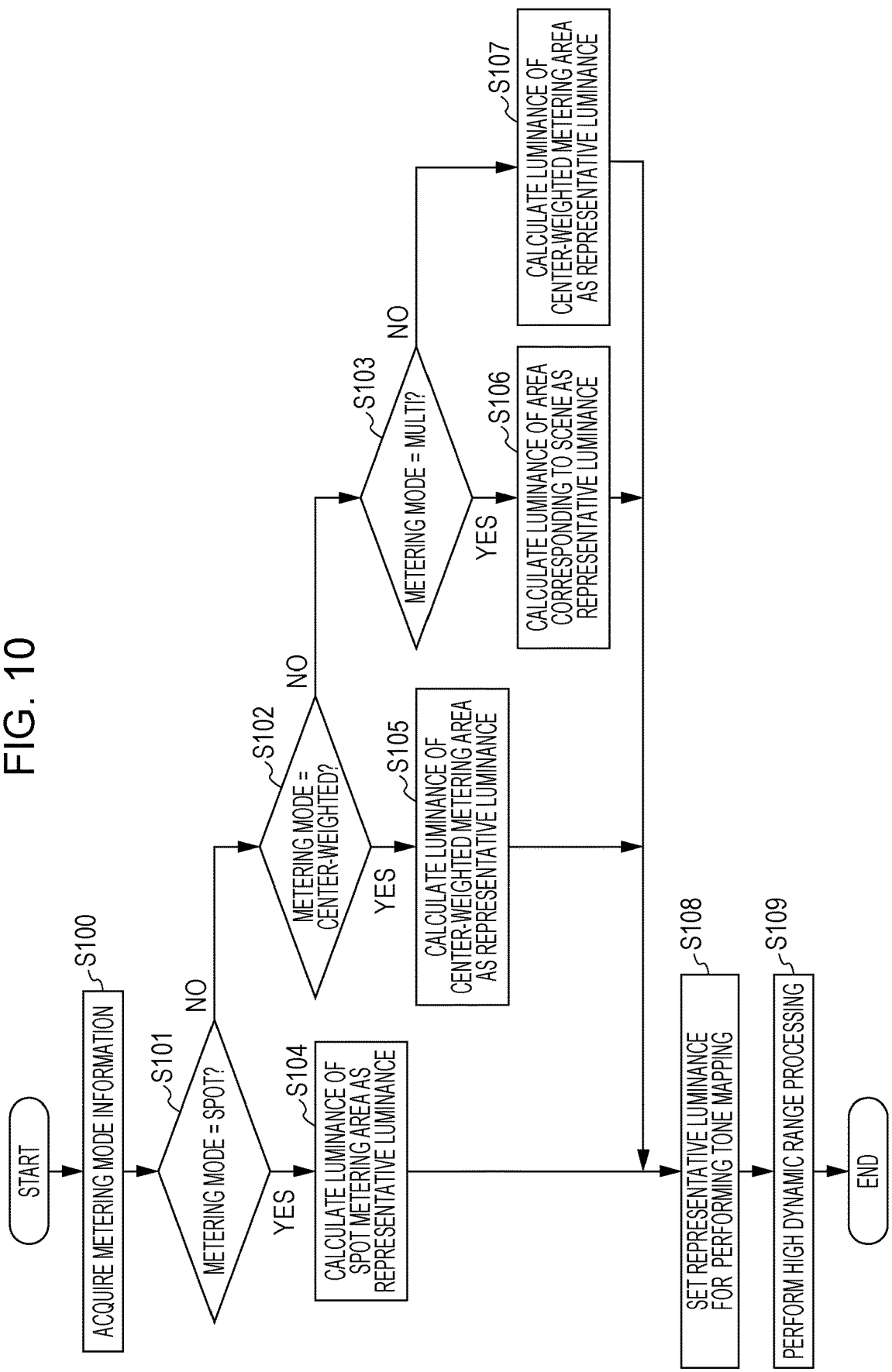
FIG. 10 is a flowchart illustrating an example of an image processing method.

FIG. 10 is a flowchart illustrating an example of an image processing method according to the present invention.

First, the metering mode information acquiring unit 101 acquires information on a metering mode set by a photographer (step S100: a metering mode information acquisition step). For example, the metering mode information acquiring unit 101 acquires information about a metering area of a metering mode set to the digital camera 2.

After that, the target area setting unit 103 sets a target area (a target area setting step). Specifically, the target area setting unit 103 determines first whether the set metering mode is spot (step S101). In a case where the metering mode is set to spot, the target area setting unit 103 sets a spot metering area as a target area, and the first luminance calculating unit 105 calculates an average luminance of the spot metering area (step S104: a first luminance calculation step). Subsequently, the first luminance calculating unit 105 calculates the average luminance of the spot metering area as a representative luminance.

In a case where the metering mode is not set to spot, the target area setting unit 103 determines whether the metering mode is set to center-weighted (step S102). In a case where the metering mode is set to center-weighted, the target area setting unit 103 sets a center-weighted metering area as a target area, and the first luminance calculating unit 105 calculates a luminance of the center-weighted metering area. For example, the first luminance calculating unit 105 calculates an average luminance of the center-weighted metering area as a representative luminance (step S105: a first luminance calculation step).

In a case where the metering mode is not set to center-weighted, the target area setting unit 103 determines whether the metering mode is set to multi (step S103). In a case where the metering mode is set to multi, the target area setting unit 103 sets an area corresponding to a shooting scene as a target area. Subsequently, the first luminance calculating unit 105 calculates a luminance of the set target area. For example, the target area setting unit 103 may set an area in which a person has been detected as a target area, or may set a detected backlit area as a target area. That is, the target area setting unit 103 sets, as a target area, an area where metering is performed in the multi metering mode. Subsequently, the first luminance calculating unit 105 calculates an average luminance of the area set as a target area as a representative luminance (step S106: a first luminance calculation step).

In a case where the metering mode is not set to multi, for example, the target area setting unit 103 uses an average luminance of the center-weighted metering area as a representative luminance (step S107: a first luminance calculation step). This is because a main photographic subject is located at the center in many cases and thus tone mapping can be performed in consideration of the luminance of the main photographic subject by using an average luminance of the center metering area as a representative luminance.

The above-described metering modes are specific examples, and a metering mode is not limited thereto. For example, the metering mode information acquiring unit 101 may acquire metering mode information indicating a metering mode that uses, as a metering area, a person area in which a person has been detected. In this case, the first luminance calculating unit 105 calculates a representative luminance on the basis of luminance information (average luminance) of the person area. Alternatively, the first luminance calculating unit 105 may calculate a representative luminance by increasing a contribution ratio of the luminance of the person area.

After that, the first condition determining unit 107 sets the calculated representative luminance as a representative luminance for performing tone mapping and determines a condition (a first condition) of high dynamic range processing (step S108: a first condition determination step).

Subsequently, the high dynamic range processing unit 109 performs high dynamic range processing on a captured image (step S109). In the tone mapping in this case, a tone curve calculated or selected on the basis of the calculated representative luminance is set.

In the above-described embodiment, the hardware structure of the processing unit that performs various processing operations is the following various processors. The various processors include a central processing unit (CPU), which is a general-purpose processor that executes software (program) and functions as various processing units; a programmable logic device (PLD), which is a processor whose circuit configuration is changeable after manufacturing, such as a field programmable gate array (FPGA); a dedicated electric circuit, which is a processor having a circuit configuration designed specifically for performing specific processing, such as an application specific integrated circuit (ASIC); and the like.

One processing unit may be constituted by one of these various processors or may be constituted by two or more processors of the same type or different types (for example, a combination of a plurality of FPGAs or a combination of a CPU and an FPGA). A plurality of processing units may be constituted by one processor. Examples in which a plurality of processing units are constitute by one processor are as follows. Firstly, as represented by a computer such as a client or a server, a combination of one or more CPUs and software constitute one processor, and the processor functions as a plurality of processing units. Secondly, as represented by System on Chip (SoC) or the like, a processor is used that implements the function of an entire system including a plurality of processing units by one integrated circuit (IC) chip. In this way, various processing units are constituted by using one or more of the above-described various processors as a hardware structure.

Furthermore, the hardware structure of these various processors is, more specifically, electric circuitry including a combination of circuit elements such as semiconductor elements.

The above-described individual configurations and functions can be appropriately implemented by certain hardware, software, or a combination thereof. For example, the present invention is applicable to a program that causes a computer to execute the above-described processing steps (processing procedure), a computer-readable recording medium (non-transitory recording medium) having the program recorded thereon, or a computer capable of installing the program therein.

Second Embodiment

Next, a second embodiment of the present invention will be described. In the present embodiment, an area of a main photographic subject in a shooting intention of a photographer is estimated by using focal distance information (subject distance information) in each distance measurement point area in a captured image, and a representative luminance is calculated on the basis of luminance information of the area.

Figure 11:
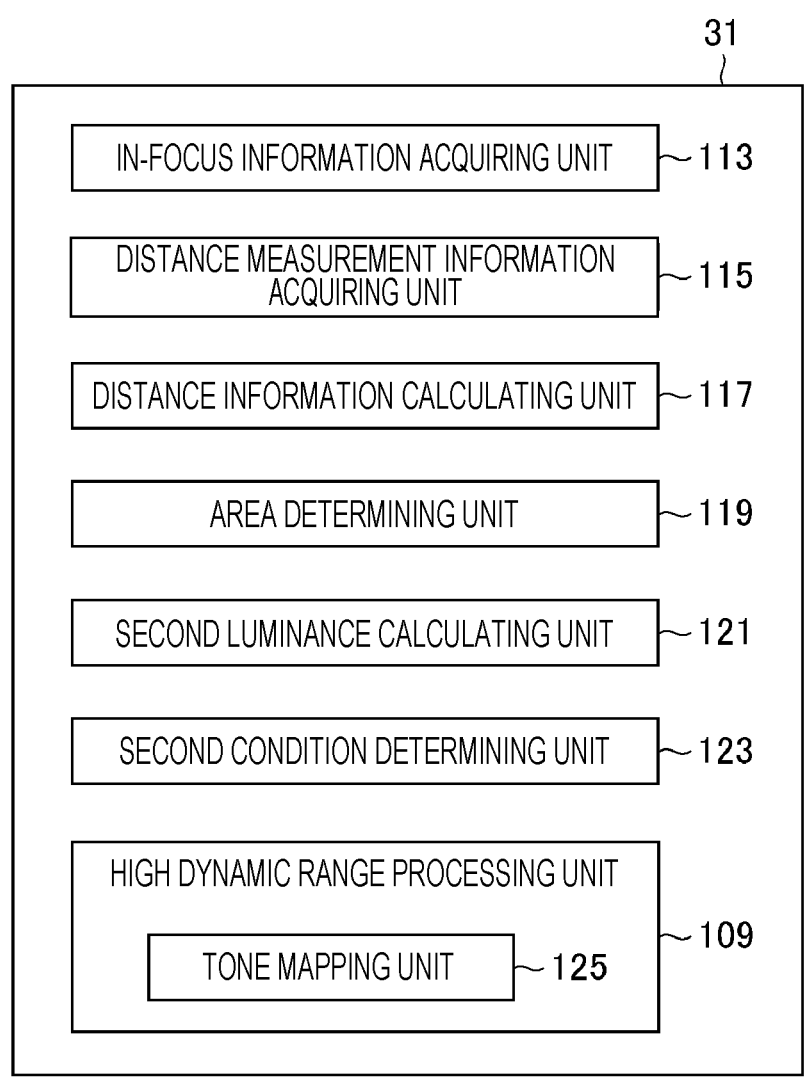
FIG. 11 is a block diagram illustrating an example functional configuration of an image processing unit.

FIG. 11 is a block diagram illustrating an example functional configuration of the image processing unit 31 according to the present embodiment.

The image processing unit 31 according to the present embodiment is constituted by an in-focus information acquiring unit 113, a distance measurement information acquiring unit 115, a distance information calculating unit 117, an area determining unit 119, a second luminance calculating unit 121, a second condition determining unit 123, and the high dynamic range processing unit 109. The parts described above with reference to FIG. 4 are denoted by the same reference numerals, and the description thereof is omitted.

The in-focus information acquiring unit 113 acquires information about an in-focus position of a captured image. The in-focus information acquiring unit 113 acquires information about an in-focus position of a captured by image by using a known technique. For example, the in-focus information acquiring unit 113 detects a blur in a captured image and acquires information about a position of a portion without a blur. In addition, for example, phase-difference pixels are disposed in the entire area of the imaging device 21, and the in-focus information acquiring unit 113 acquires information about an in-focus position on the basis of information from the phase-difference pixels. In a case where an AF function is used, focus is achieved in an AF frame, and thus information about an in-focus position may be acquired on the basis of the AF frame. The in-focus information acquiring unit 113 acquires information about an in-focus position in a shooting angle of view.

The distance measurement information acquiring unit 115 acquires first distance information which is distance information of a plurality of areas in the captured image. The distance measurement information acquiring unit 115 acquires first distance information of a captured image by using a known technique. For example, the distance information calculating unit 117 acquires first distance information of each area of a captured image on the basis of distance information acquired by the phase-difference pixels disposed in the entire area of the imaging device 21. Alternatively, the distance measurement information acquiring unit 115 may acquire first distance information by using a distance measuring device (not illustrated) equipped in the digital camera 2 and may use the first distance information as distance information (first distance information) of a plurality of areas in a captured image.

The distance information calculating unit 117 calculates, on the basis of the information about the in-focus position and the first distance information of the plurality of areas, for each of the plurality of areas, second distance information which is information indicating a distance from the in-focus position. The distance information calculating unit 117 acquires second distance information by using a known technique. Here, the second distance information indicates a distance in an optical-axis direction from the in-focus position.

The area determining unit 119 determines, on the basis of the second distance information, for each of the plurality of areas, a representative luminance calculation area for acquiring a luminance that is to be used to calculate a representative luminance that is to be used in high dynamic range processing. For example, the area determining unit 119 determines a representative luminance calculation area on the basis of a threshold value and the second distance information. In addition, for example, the area determining unit 119 determines a representative luminance calculation area on the basis of the second distance information and a depth of field at the in-focus position.

The second luminance calculating unit 121 calculates the representative luminance on the basis of a luminance obtained in the representative luminance calculation area. For example, the second luminance calculating unit 121 calculates an average luminance of the representative luminance calculation area and regards the average luminance as the representative luminance.

The second condition determining unit 123 determines a second condition of the high dynamic range processing on the basis of the representative luminance calculated by the second luminance calculating unit 121.

Figure 12:
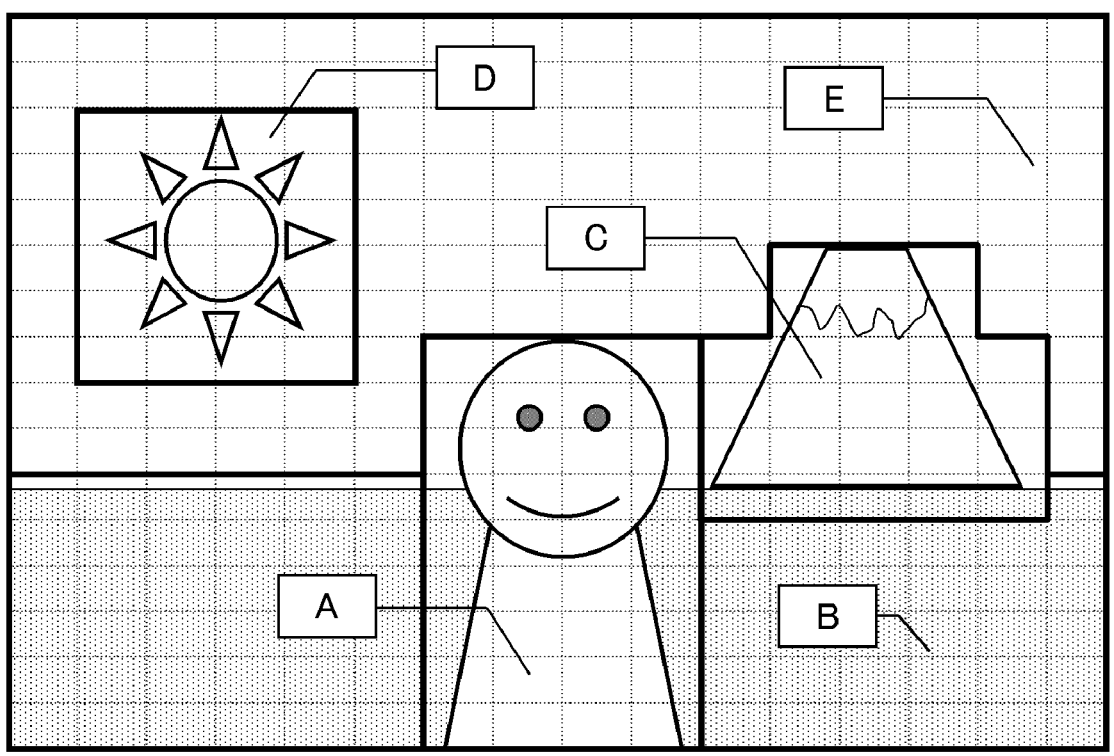
FIG. 12 is a diagram illustrating distance information of individual objects in a captured image.

FIG. 12 is a diagram illustrating the first distance information of individual objects in a captured image. FIG. 12 illustrates a case where the captured image is divided into areas A, B, C, D, and E in ascending order of the focal distance (subject distance) from the closest position, and it is assumed that the focal distance is uniform within each area.

Because the area A is in focus, the in-focus information acquiring unit 113 acquires position information of the area A. In addition, the distance measurement information acquiring unit 115 acquires, for example, the focal distances (first distance information) of the areas A, B, C, D, and E before acquisition of the captured image by using the phase-difference pixels disposed in the imaging device 21. The distance information calculating unit 117 calculates the distances from the in-focus position to the areas B, C, D, and E (second distance information).

The focal distances of the areas A to E are represented by dis(A) to dis(E), respectively. In a case where dis(A) is at an in-focus position and dis(A) to dis(D) are within a depth-of-field range, an average luminance of the areas A to D is calculated by the second luminance calculating unit 121, and a representative luminance is calculated.

Figure 13:
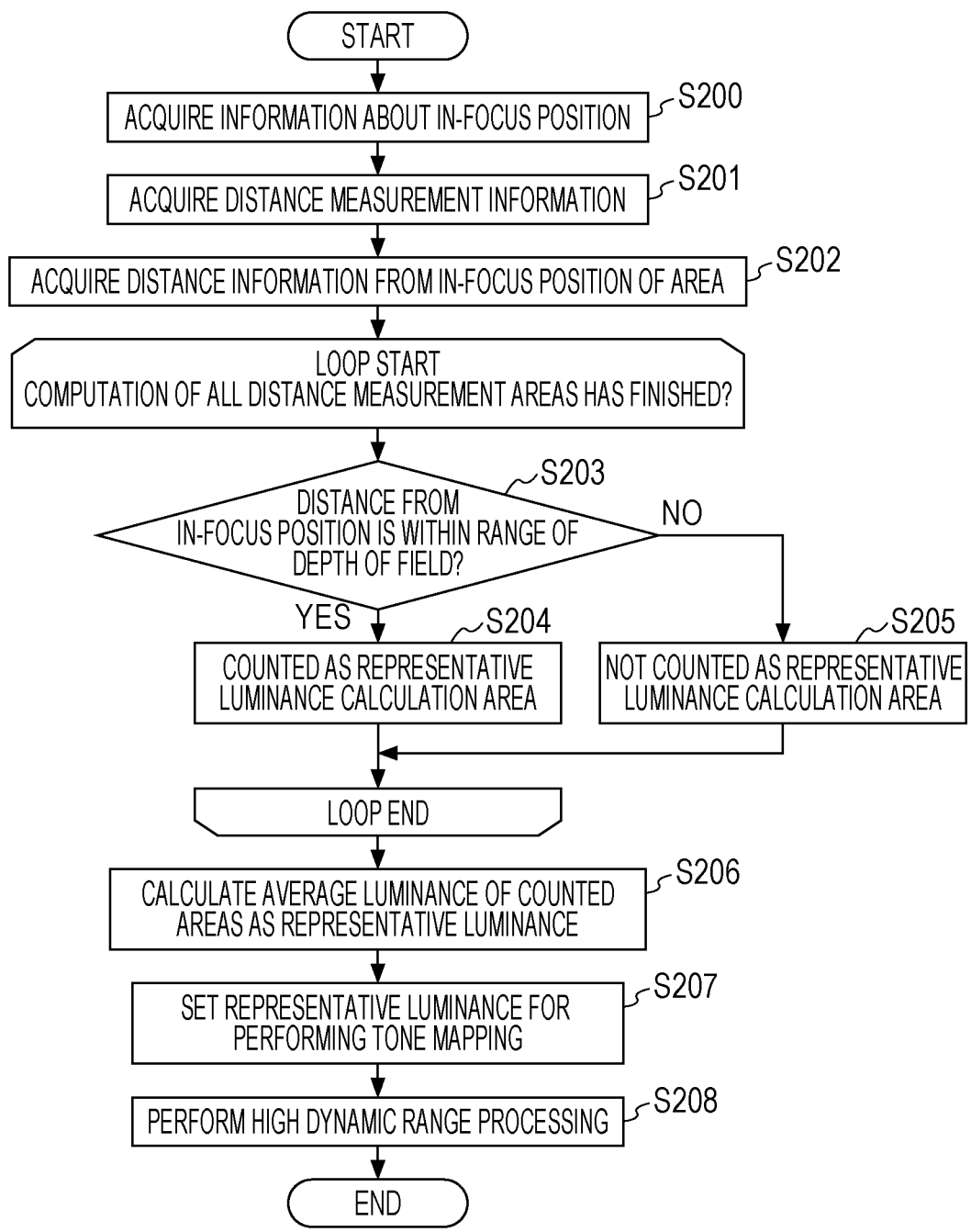
FIG. 13 is a flowchart illustrating an example of an image processing method.

FIG. 13 is a flowchart illustrating an example of an image processing method according to the present invention.

First, the in-focus information acquiring unit 113 acquires information about an in-focus position targeted by a photographer (step S200: an in-focus information acquisition step). For example, the in-focus information acquiring unit 113 acquires XY coordinates, which is information on an in-focus position in a captured image. After that, the distance measurement information acquiring unit 115 acquires first distance information which is distance information of a plurality of areas in the captured image (step S201: a distance measurement information acquisition step). For example, the distance measurement information acquiring unit 115 acquires, by using the phase-difference pixels disposed in the imaging device 21, relative distances of individual areas within a shooting angle of view from the in-focus position as first distance information.

Subsequently, the distance information calculating unit 117 calculates second distance information which is distance information of the individual areas, from the first distance information and the information about the in-focus position (step S202: a distance information calculation step).

Subsequently, the area determining unit 119 determines whether or not the distance from the in-focus position of each area is within the range of a depth of field (step S203: an area determination step). An area in which the distance from the in-focus position is within the range of the depth of field is determined to be (counted as) a representative luminance calculation area (step S204), whereas an area in which the distance from the in-focus position is out of the range of the depth of field is determined not to be a representative luminance calculation area (step S205).

After that, the second luminance calculating unit 121 calculates the luminance of the area determined to be a representative luminance calculation area as a representative luminance (step S206: a second luminance calculation step). For example, the second luminance calculating unit 121 calculates an average luminance of the areas determined to be a representative luminance calculation area as a representative luminance. After that, the second condition determining unit 123 determines a condition (a second condition) of tone mapping of high dynamic range processing on the basis of the representative luminance (step S207: a second condition determination step). Specifically, a tone curve for performing tone mapping is set on the basis of the representative luminance. After that, the high dynamic range processing unit 109 performs high dynamic range processing (step S208).

Third Embodiment

Next, a third embodiment of the present invention will be described. In the present embodiment, there are both a case where a target area is determined by using information on a metering mode as in the first embodiment and a case where a target area is determined in accordance with information on the focal distance of each area (subject distance information) as in the second embodiment.

Figure 14:
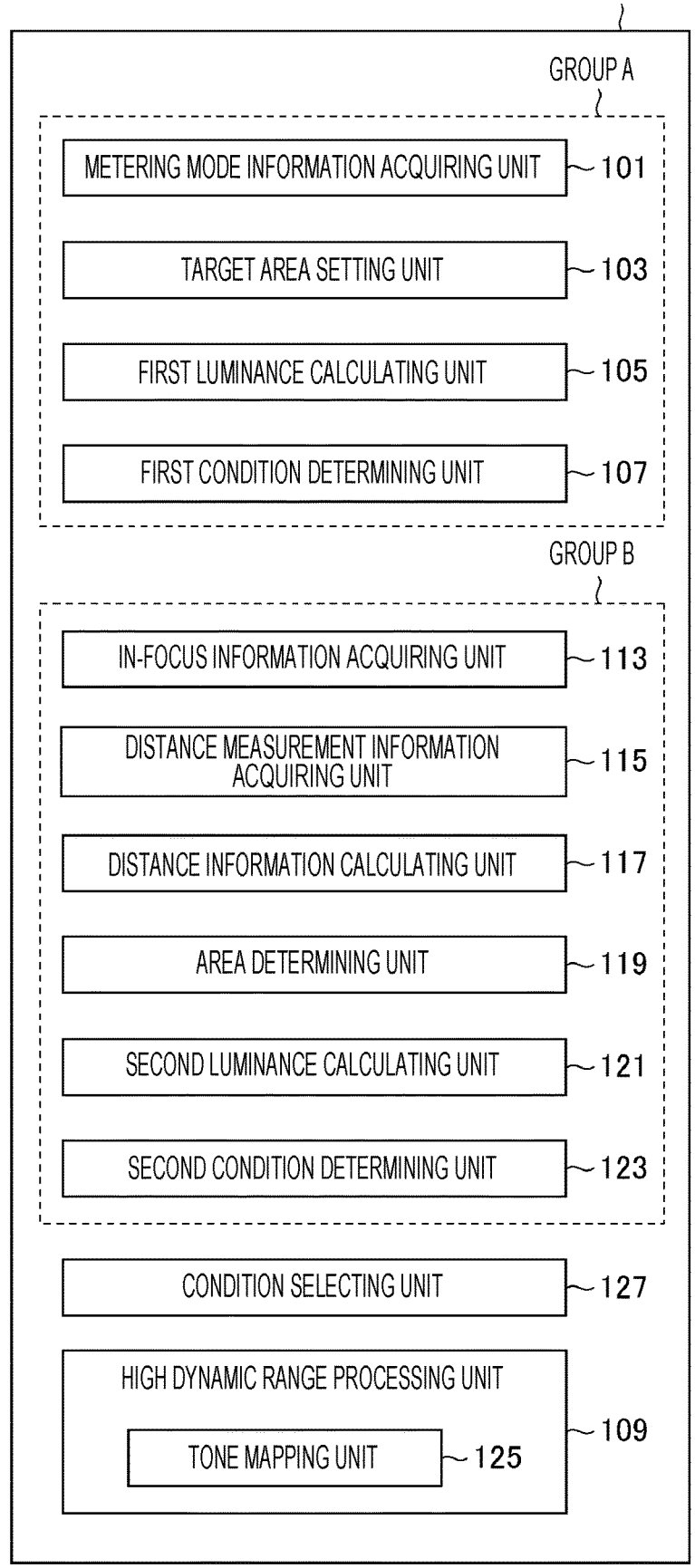
FIG. 14 is a block diagram illustrating an example functional configuration of an image processing unit.

FIG. 14 is a block diagram illustrating an example functional configuration of the image processing unit 31 according to the present embodiment. The parts described above with reference to FIG. 4 and FIG. 11 are denoted by the same reference numerals, and the description thereof is omitted.

The image processing unit 31 according to the present embodiment is constituted by the metering mode information acquiring unit 101, the target area setting unit 103, the first luminance calculating unit 105, the first condition determining unit 107 (these units belong to a group A), the in-focus information acquiring unit 113, the distance measurement information acquiring unit 115, the distance information calculating unit 117, the area determining unit 119, the second luminance calculating unit 121, the second condition determining unit 123 (these units belong to a group B), a condition selecting unit 127, and the high dynamic range processing unit 109. In the figure, the functional blocks described mainly in the first embodiment belong to the group A, and the functional blocks described mainly in the second embodiment belong to the group B.

The condition selecting unit 127 determines, on the basis of metering mode information, which of a first condition and a second condition is to be used to perform high dynamic range processing. That is, the condition selecting unit 127 determines, in accordance with the metering mode information, which of the first condition for high dynamic range processing determined by the functional blocks belonging to the group A and the second condition for high dynamic range processing determined by the functional blocks belonging to the group B is to be used. That is, the condition selecting unit 127 selects the first condition in which a target area has been determined by using the metering mode information or the second condition in which a target area has been determined by using information on the focal distance of each area, to be used in high dynamic range processing. For example, in a case where the spot metering mode or the center-weighted metering mode is set, the intention of the photographer is adequately reflected in the metering mode, and thus the condition selecting unit 127 determines to use the first condition to perform high dynamic range processing. In a case where another metering mode is set, the condition selecting unit 127 determines to use the second condition to perform high dynamic range processing.

Figure 15:
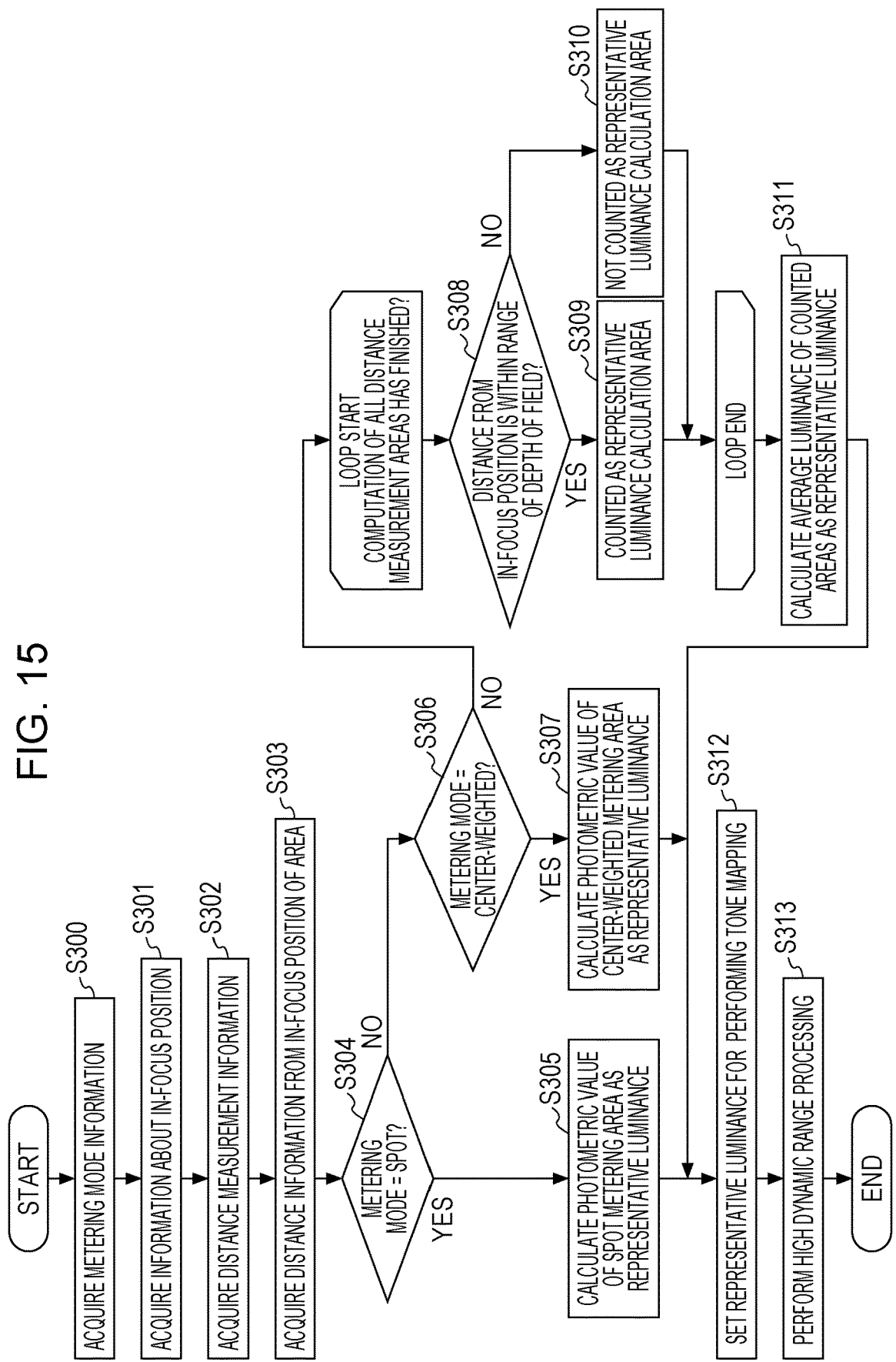
FIG. 15 is a flowchart illustrating an example of an image processing method.

FIG. 15 is a flowchart illustrating an example of an image processing method according to the present embodiment.

First, the metering mode information acquiring unit 101 acquires information on a metering mode set by a photographer (step S300). Then, the condition selecting unit 127 determines which one of the first condition and the second condition is to be used in the high dynamic range processing, on the basis of the acquired information on metering mode. After that, the in-focus information acquiring unit 113 acquires information about an in-focus position targeted by the photographer (step S301). Subsequently, the distance measurement information acquiring unit 115 acquires first distance information which is distance information of a plurality of areas in a captured image (step S302). After that, the distance information calculating unit 117 acquires distance information of each area from the first distance information and the information about the in-focus position (step S303).

After that, the target area setting unit 103 sets a target area. Specifically, the target area setting unit 103 determines whether the metering mode is set to spot (step S304). In a case where the metering mode is set to spot, the target area setting unit 103 sets a spot metering area as a target area, and the first luminance calculating unit 105 calculates an average luminance of the spot metering area (step S305). Subsequently, the first luminance calculating unit 105 calculates the average luminance of the spot metering area as a representative luminance.

In a case where the metering mode is not set to spot, the target area setting unit 103 determines whether the metering mode is set to center-weighted (step S306). In a case where the metering mode is set to center-weighted, the target area setting unit 103 sets a center-weighted metering area as a target area, and the first luminance calculating unit 105 calculates the luminance of the center-weighted metering area. For example, the first luminance calculating unit 105 calculates an average luminance of the center-weighted metering area as a representative luminance (step S307).

In a case where the metering mode is not set to center-weighted, the target area setting unit 103 causes the area determining unit 119 to determine a representative luminance calculation area. That is, the area determining unit 119 determines whether or not the distance of each area from the in-focus position is within the range of a depth of field (step S308). An area in which the distance from the in-focus position is within the range of the depth of field is determined to be a representative luminance calculation area (step S309), whereas an area in which the distance from the in-focus position is out of the range of the depth of field is determined not to be a representative luminance calculation area (step S310).

After that, the second luminance calculating unit 121 calculates the luminance of the area determined to be a representative luminance calculation area as a representative luminance (step S311). For example, the second luminance calculating unit 121 calculates an average luminance of the areas determined to be a representative luminance calculation area as a representative luminance.

After that, in a case where the condition selecting unit 127 selects the first condition, the first condition determining unit 107 sets the representative luminance calculated by the first luminance calculating unit 105 as the representative luminance when the tone mapping of high dynamic range processing is performed, and determines a condition (first condition) of high dynamic range processing (step S312). On the other hand, in a case where the condition selecting unit 127 selects the second condition, the second condition determining unit 123 sets the representative luminance calculated by the second luminance calculating unit 121 as the representative luminance when the tone mapping of high dynamic range processing is performed, and determines a condition (second condition) of high dynamic range processing (step S312).

Subsequently, the high dynamic range processing unit 109 performs high dynamic range processing on the captured image (step S313). In tone mapping in this case, a tone curve calculated or selected on the basis of the calculated representative luminance is set.

Next, modification examples of the present invention will be described. The modification examples described below are applicable to any of the above-described first to third embodiments.

Modification Example 1

Modification example 1 of the present invention will be described. In this example, the luminance of a peripheral area other than a target area or a representative luminance calculation area is also used to calculate a representative luminance. Specifically, the target area setting unit 103 sets a weight to the luminance of a peripheral area which is an area other than a target area, in accordance with the distance from the target area, and the first luminance calculating unit 105 calculates a representative luminance on the basis of the weighted luminance of the peripheral area and the luminance of the target area.

Figure 16:
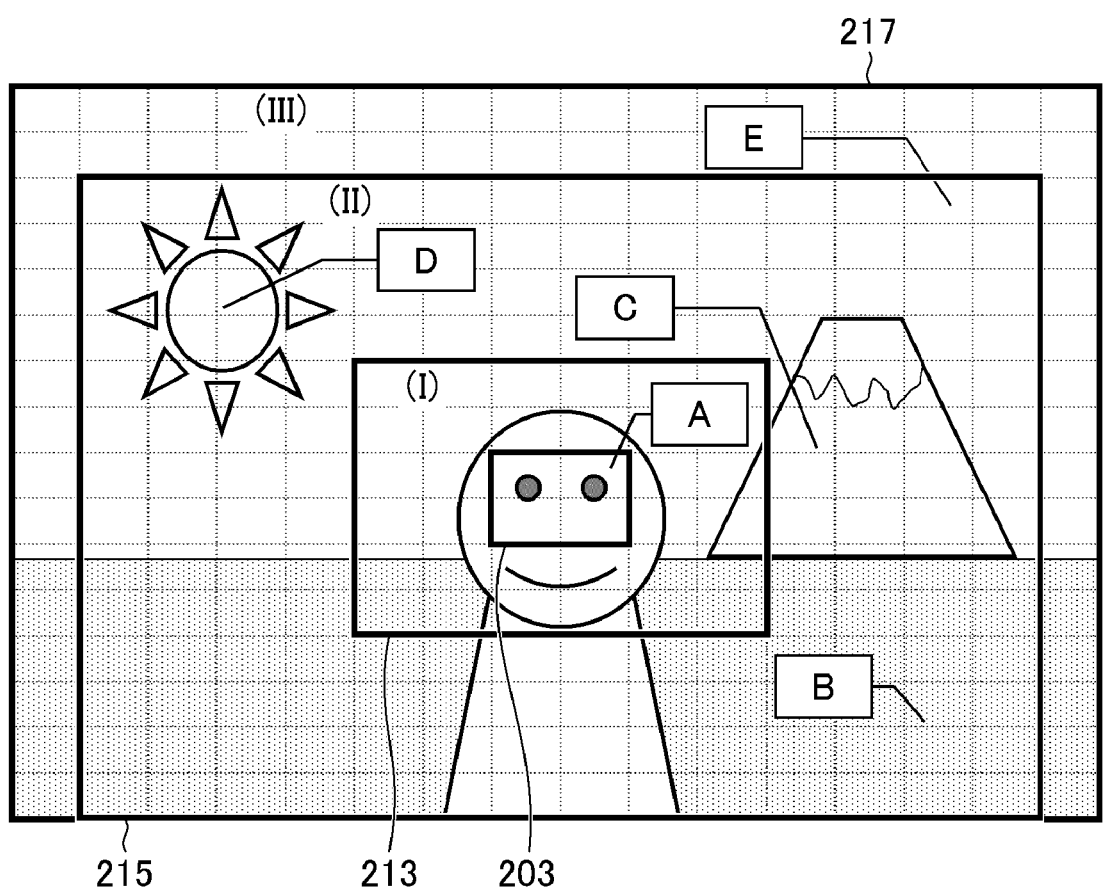
FIG. 16 is a diagram illustrating a target area and peripheral areas other than the target area in a captured image.

FIG. 16 is a diagram illustrating a target area and peripheral areas other than the target area in a captured image. A peripheral area (I) 213, a peripheral area (II) 215, and a peripheral area (III) 217 are set around a target area 203. The target area setting unit 103 sets a weight to the peripheral area (I) 213, the peripheral area (II) 215, and the peripheral area (III) 217. For example, the target area setting unit 103 sets a weight to the peripheral area (I) 213, the peripheral area (II) 215, and the peripheral area (III) 217 such that the ratio of contribution of each peripheral area to a representative luminance increases as the distance from the target area decreases.

The first luminance calculating unit 105 calculates a representative luminance on the basis of the luminance information of the peripheral area (I) 213, the peripheral area (II) 215, and the peripheral area (III) 217 that have been weighted and the luminance information of the target area. For example, the first luminance calculating unit 105 calculates the average luminances of the peripheral area (I) 213, the peripheral area (II) 215, and the peripheral area (III) 217, applies set weights thereto, calculates the average luminance of the target area, adds the individual average luminances, and thereby calculates a representative luminance. The description given above is related to the first embodiment (the target area setting unit 103 and the first luminance calculating unit 105), but this example is also applied to the second embodiment (the area determining unit 119 and the second luminance calculating unit 121).

Modification Example 2

Modification example 2 of the present invention will be described. In this example, in the case of calculating a representative luminance, the representative luminance is calculated by setting an upper limit or a lower limit to luminance information.

Figure 17:
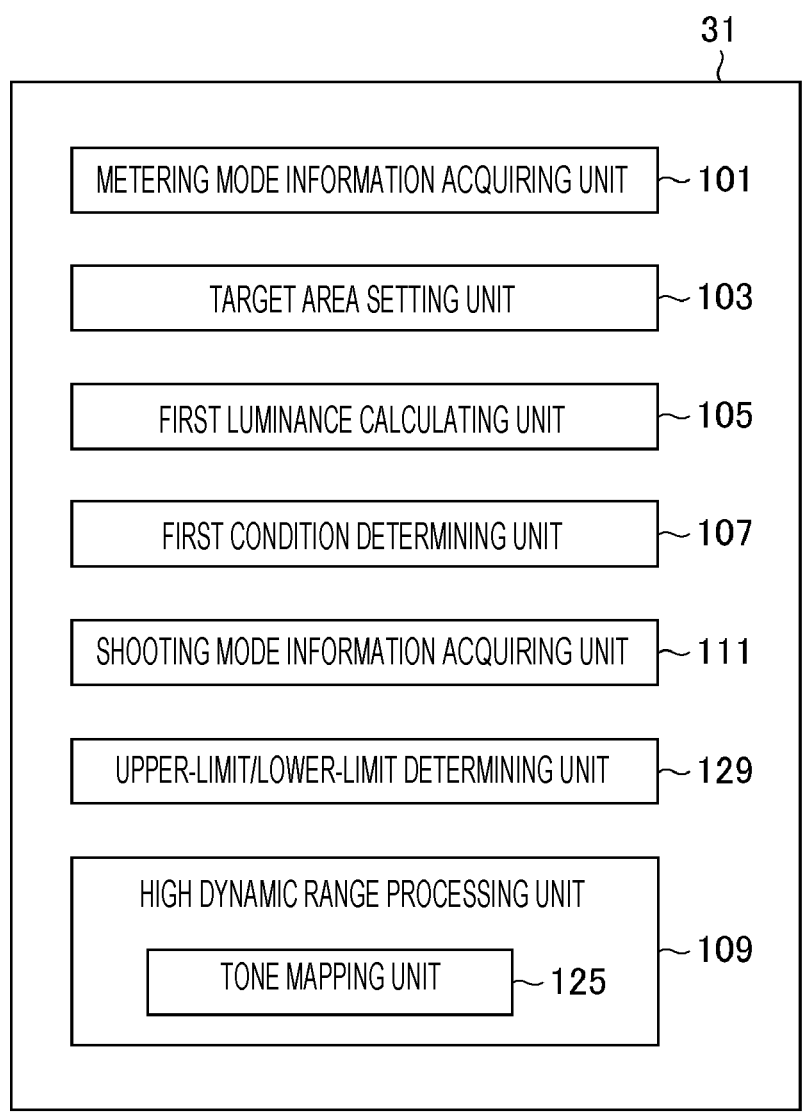
FIG. 17 is a block diagram illustrating an example functional configuration of an image processing unit.

FIG. 17 is a block diagram illustrating an example functional configuration of the image processing unit 31 according to this example. The parts described above with reference to FIG. 4 are denoted by the same reference numerals, and the description thereof is omitted.

A shooting mode information acquiring unit 111 acquires shooting mode information which is information about a shooting mode of shooting a photographic subject. For example, the shooting mode information acquiring unit 111 acquires information about a daylight outdoor shooting mode, a twilight scene shooting mode, a night scene shooting mode, or a fireworks shooting mode set to the digital camera 2. These shooting modes are set in the system control unit 25 by a photographer using the operation unit 9. As a result of a shooting mode being set, shooting conditions for the photographic subject are automatically set to the digital camera 2.

An upper-limit/lower-limit determining unit 129 determines, on the basis of the shooting mode information acquired by the shooting mode information acquiring unit 111, an upper limit or a lower limit of luminance information of a target area that is to be used to calculate a representative luminance. That is, the upper-limit/lower-limit determining unit 129 determines an upper limit or a lower limit of luminance information of a target area in accordance with the shooting mode, and calculates a representative luminance by using luminance information within a range from the upper limit or the lower limit. The first luminance calculating unit 105 calculates a representative luminance on the basis of a luminance for which the upper limit or the lower limit is set. Accordingly, the dynamic range that can be expressed in high dynamic range processing can be determined in accordance with a designing intention. In FIG. 17, the description has been given about application of the first embodiment, but this example is also applicable to another embodiment. For example, the upper-limit/lower-limit determining unit 129 determines, on the basis of the shooting mode information acquired by the shooting mode information acquiring unit 111, an upper limit or a lower limit of luminance information of a representative luminance calculation area used to calculate a representative luminance. The second luminance calculating unit 121 calculates a representative luminance on the basis of the luminance to which the upper limit or the lower limit is set.

Examples of the present invention have been described above. Obviously, the present invention is not limited to the above-described embodiments, and various changes can be made without deviating from the spirit of the present invention.

REFERENCE SIGNS LIST

2 digital camera
3 camera main body
4 lens barrel
5 flash emitting unit
6 shutter button
7 power switch
8 display unit
9 operation unit
10 external memory
12 lens unit
20 mechanical shutter
21 imaging device
22 processing unit
23 AD conversion unit
24 main memory
25 system control unit
26 shutter driving unit
27 lens driving unit
28 power source control unit
29 power source
30 control memory
31 image processing unit
32 compression/decompression unit
33 storage control unit
35 display control unit
36 user interface
101 metering mode information acquiring unit
103 target area setting unit
105 first luminance calculating unit
107 first condition determining unit
109 high dynamic range processing unit
111 shooting mode information acquiring unit
113 in-focus information acquiring unit
115 distance measurement information acquiring unit
117 distance information calculating unit
119 area determining unit
121 second luminance calculating unit
123 second condition determining unit
125 tone mapping unit
127 condition selecting unit
129 upper-limit/lower-limit determining unit
step S100 to step S109 first image processing steps
step S200 to step S208 second image processing steps
step S300 to step S313 third image processing steps

What is claimed is:

1. An image processing device, comprising:
    a processor configured to:
        acquire metering mode information indicating a metering mode set from among a plurality of metering modes;
        set, on the basis of the metering mode information, a target area that is to be used to calculate a representative luminance that is to be used in high dynamic range processing;
        calculate the representative luminance on the basis of luminance information of the target area that is set; and
        determine a first condition of the high dynamic range processing on the basis of the representative luminance that is calculated;
        acquire information about an in-focus position of a captured image;
        acquire first distance information which is distance information of a plurality of areas in the captured image;
        calculate, on the basis of the information about the in-focus position and the first distance information of the plurality of areas, for each of the plurality of areas, second distance information which is information indicating a distance from the in-focus position;
        determine, on the basis of the second distance information, for each of the plurality of areas, a representative luminance calculation area for acquiring the luminance information that is to be used to calculate the representative luminance that is to be used in the high dynamic range processing,
    wherein the processor compares the second distance information with a depth of field and determines that the representative luminance calculation area is the area which has the second distance information within the depth of field;
        calculate the representative luminance on the basis of luminance information of the representative luminance calculation area;
        determine a second condition of the high dynamic range processing on the basis of the representative luminance that is calculated; and
        determine, on the basis of the metering mode information, which of the first condition and the second condition is to be used to perform the high dynamic range processing.

2. An image processing device comprising:
    a processor configured to:
        acquire information about an in-focus position of a captured image set by a photographer;
        acquire first distance information which is distance information of a plurality of areas in the captured image;
        calculate, on the basis of the information about the in-focus position and the first distance information of the plurality of areas, for each of the plurality of areas, second distance information which is information indicating a distance from the in-focus position;
        determine, on the basis of the second distance information, for each of the plurality of areas, a representative luminance calculation area in which a shooting intention of the photographer is reflected for acquiring luminance information that is to be used to calculate a representative luminance that is to be used in high dynamic range processing, wherein the processor compares the second distance information with a depth of field and determines that the representative luminance calculation area is the area which has the second distance information within the depth of field;

calculate the representative luminance in which the shooting intention of the photographer is reflected on the basis of luminance information of the representative luminance calculation area; and determine a second condition of the high dynamic range processing on the basis of the representative luminance that is calculated.

3. The image processing device according to claim 2, wherein the processor determines the second condition of the high dynamic range processing in which more tones are allocated to the representative luminance and luminances close to the representative luminance than to other luminances.

4. The image processing device according to claim 2, wherein the processor determines the representative luminance calculation area on the basis of the second distance information and a depth of field.

5. The image processing device according to claim 2, wherein the processor is further configured to:

acquire shooting mode information which is information about a shooting mode for shooting a photographic subject; and determine, on the basis of the shooting mode information that is acquired, an upper limit or a lower limit of the luminance information of the representative luminance calculation area that is to be used to calculate the representative luminance, wherein the processor calculates the representative luminance on the basis of the luminance information for which the upper limit or the lower limit is set.

6. The image processing device according to claim 3, wherein the processor is further configured to determine the first condition of the high dynamic range processing in which a tone curve is a steepest in 3 to 10% of an entire range including the representative luminance.

7. An image processing method comprising:

acquiring information about an in-focus position of a captured image set by a photographer;

acquiring first distance information which is distance information of a plurality of areas in the captured image;

calculating, on the basis of the information about the in-focus position and the first distance information of the plurality of areas, for each of the plurality of areas, second distance information which is information indicating a distance from the in-focus position;

determining, on the basis of the second distance information, for each of the plurality of areas, a representative luminance calculation area in which a shooting intention of the photographer is reflected for acquiring luminance information that is to be used to calculate a representative luminance that is to be used in high dynamic range processing, wherein the processor compares the second distance information with a depth of field and determines that the representative luminance calculation area is the area which has the second distance information within the depth of field;

calculating the representative luminance in which the shooting intention of the photographer is reflected on the basis of luminance information of the representative luminance calculation area; and determining a second condition of the high dynamic range processing on the basis of the representative luminance that is calculated.

8. A non-transitory computer-readable recording medium that causes a computer to execute image processing in a case where a command stored in the recording medium is read by the computer, the image processing comprising:

acquiring information about an in-focus position of a captured image set by a photographer;

acquiring first distance information which is distance information of a plurality of areas in the captured image;

calculating, on the basis of the information about the in-focus position and the first distance information of the plurality of areas, for each of the plurality of areas, second distance information which is information indicating a distance from the in-focus position;

determining, on the basis of the second distance information, for each of the plurality of areas, a representative luminance calculation area in which a shooting intention of the photographer is reflected for acquiring luminance information that is to be used to calculate a representative luminance that is to be used in high dynamic range processing, wherein the processor compares the second distance information with a depth of field and determines that the representative luminance calculation area is the area which has the second distance information within the depth of field;

calculating the representative luminance in which the shooting intention of the photographer is reflected on the basis of luminance information of the representative luminance calculation area; and determining a second condition of the high dynamic range processing on the basis of the representative luminance that is calculated.

* * * * *